(12) United States Patent
Kang et al.

(10) Patent No.: US 11,562,844 B2
(45) Date of Patent: Jan. 24, 2023

(54) CORE, TRANSFORMER, POWER CONVERTING APPARATUS, AND PHOTOVOLTAIC MODULE INCLUDING THE SAME

(71) Applicant: LG ELECTRONICS INC., Seoul (KR)

(72) Inventors: Younjong Kang, Seoul (KR); Myonghwan Kim, Seoul (KR); Yunsu Bae, Seoul (KR); Juhwan Yun, Seoul (KR)

(73) Assignee: SHANGRAO JINKO SOLAR TECHNOLOGY DEVELOPMENT CO., LTD, Jiangxi Province (CN)

( * ) Notice: Subject to any disclaimer, the term of this patent is extended or adjusted under 35 U.S.C. 154(b) by 599 days.

(21) Appl. No.: 16/420,455

(22) Filed: May 23, 2019

(65) Prior Publication Data
US 2019/0362880 A1 Nov. 28, 2019

(30) Foreign Application Priority Data
May 24, 2018 (KR) .................. 10-2018-0059223

(51) Int. Cl.
*H01F 27/24* (2006.01)
*H01F 27/28* (2006.01)

(52) U.S. Cl.
CPC ......... *H01F 27/24* (2013.01); *H01F 27/2828* (2013.01)

(58) Field of Classification Search
CPC ........ H01F 27/325; H01F 27/326; H01F 5/02; H01F 2005/022; H01F 27/24;
(Continued)

(56) References Cited

U.S. PATENT DOCUMENTS

| 4,613,841 A | 9/1986 | Roberts |
| 5,053,738 A * | 10/1991 | Sato .................. H01F 38/10 |
| | | 336/215 |

(Continued)

FOREIGN PATENT DOCUMENTS

| JP | 03-166708 A | 7/1991 |
| JP | 06124844 A * | 5/1994 |

(Continued)

OTHER PUBLICATIONS

Extended European Search Report for European Application No. 19808159.8, dated Feb. 16, 2022.
(Continued)

*Primary Examiner* — Tszfung J Chan
(74) *Attorney, Agent, or Firm* — Tarolli, Sundheim, Covell & Tummino LLP

(57) ABSTRACT

Disclosed are a core, a transformer, a power converting apparatus, and a photovoltaic module including the same. The core includes: a base; outer wall formed on the base; a first protruding member protruding on the base and disposed within the outer wall; and a second protruding member protruding on the base, disposed within the outer wall, and separated from the first protruding member, wherein a length of an edge of the second protruding member opposing the first protruding member is less than an outer circumference of the first protruding member. Accordingly, the second protruding member may be machined so easily that a leakage inductance can be easily controlled according to design specification.

18 Claims, 32 Drawing Sheets

(58) Field of Classification Search
CPC .... H01F 17/04; H01F 27/2828; H01F 17/043; H01F 27/32; H01F 27/233; H01F 27/234
USPC ......... 336/83, 178, 185, 196, 198, 199, 208, 336/212, 213, 211, 221
See application file for complete search history.

(56) References Cited

U.S. PATENT DOCUMENTS

| | | | | |
|---|---|---|---|---|
| 8,643,459 B2* | 2/2014 | Eom | ...................... | H01F 27/26 336/198 |
| 8,698,586 B2* | 4/2014 | Park | ...................... | H01F 27/325 336/192 |
| 10,930,423 B1* | 2/2021 | Folker | ................. | H01F 41/0206 |
| 2005/0068149 A1* | 3/2005 | Fushimi | ................ | H01F 27/306 336/208 |
| 2005/0270745 A1* | 12/2005 | Chen | .................. | H01F 27/2804 361/707 |
| 2007/0035375 A1* | 2/2007 | Yang | ...................... | H01F 38/10 336/212 |
| 2008/0079525 A1* | 4/2008 | Sundaram | ............ | H01F 27/289 336/182 |
| 2009/0128277 A1* | 5/2009 | Moiseev | ................. | H01F 27/38 336/170 |
| 2013/0328654 A1* | 12/2013 | Iwakura | ................ | H01F 27/006 336/196 |
| 2014/0313004 A1* | 10/2014 | Harrison | ................... | H01F 3/10 336/178 |
| 2016/0365804 A1* | 12/2016 | Nakagawa | ............ | H01F 27/325 |
| 2018/0323720 A1* | 11/2018 | Njiende | .................... | H01F 3/14 |

FOREIGN PATENT DOCUMENTS

| | | | | |
|---|---|---|---|---|
| JP | 2007-53330 A | | 3/2007 | |
| JP | 2008004780 A | * | 1/2008 | |
| JP | 2008-91913 A | | 4/2008 | |
| JP | 2012-76299 A | | 7/2012 | |
| JP | 2015-50235 A | | 3/2015 | |
| JP | 10-1762559 B | | 7/2017 | |
| KR | 10-2016-0025933 A | | 3/2016 | |
| WO | WO-2015194209 A1 | * | 12/2015 | ............ H01F 30/00 |

OTHER PUBLICATIONS

KR Office Action dated Nov. 18, 2022 for corresponding KR application No. 10-2018-0059223.

* cited by examiner

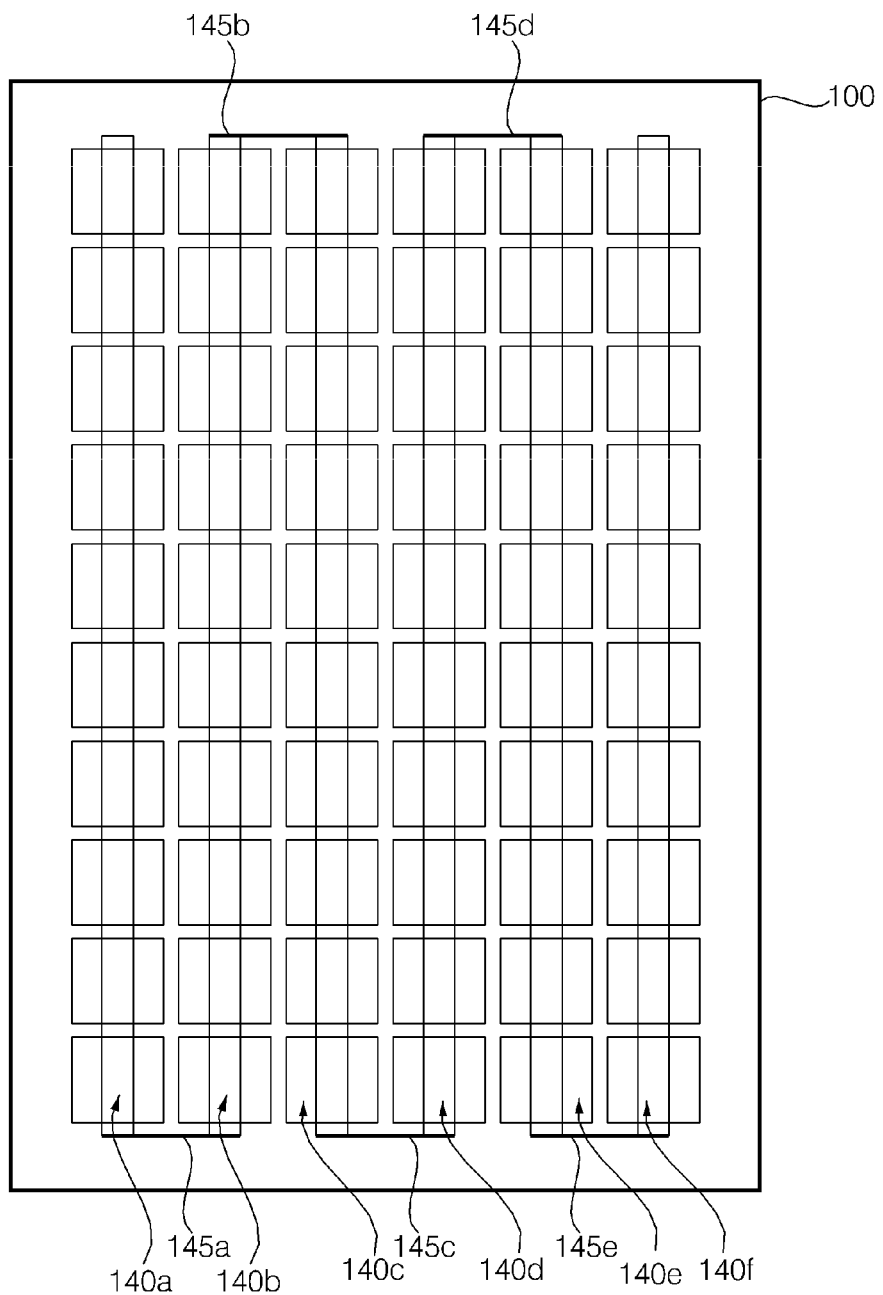

CORE, TRANSFORMER, POWER CONVERTING APPARATUS, AND PHOTOVOLTAIC MODULE INCLUDING THE SAME

CROSS-REFERENCE TO RELATED APPLICATION

This application claims the priority benefit of Korean Patent Application No. 10-2018-0059223, filed on May 24, 2018 in the Korean Intellectual Property Office, the disclosure of which is incorporated herein by reference.

BACKGROUND OF THE INVENTION

1. Field of the Invention

The present invention relates to a core, a transformer, a power converting apparatus, and a photovoltaic module including the same, and more particularly to a core, a transformer, a power converting apparatus, and a photovoltaic module including the same, the core which is machinable so easily that a leakage inductance can be easily controlled according to design specification.

2. Description of the Related Art

A power converting apparatus is adapted to a photovoltaic module or the like, which produces reusable energy, to provide alternating power (AC) or the like.

In particular, a transformer, a leakage inductor, and the like are used in a converter in order to convert direct power (DC) power produced by a photovoltaic module or the like.

Meanwhile, in the case where a winding space of the transformer is divided into an upper area and a lower area and an air gap is disposed in the middle between the upper area and the lower area. In this case, however, since a core space is fixed at the center, it is difficult to control a leakage inductance.

Meanwhile, when mounted on a circuit board, the transformer and the leakage inductor occupy a considerable volume.

For this reason, there are ongoing efforts to make a transformer and a leakage inductor compact so that a power converting apparatus to be attached to a photovoltaic module can be made compact. In particular, researches and studies are conducting on an integrated transformer in which a transformer and a leakage inductor are integrated.

Meanwhile, U.S. Patent Application Publication No. 20140313004 discloses an integrated transformer. In such an integrated transformer, a circular inner wall and a second circular inner wall surrounding the same are disposed in addition to an outer wall of a core. However, the inner wall and the second wall, which produce a leakage inductance, have a circular shape and thus easy machining is not allowed, and the leakage inductance cannot be easily controlled according to design specification.

SUMMARY OF THE INVENTION

An object of the present invention is to provide a core, a transformer, a power converting apparatus, and a photovoltaic module including the same, the core which is machinable so easily that a leakage inductance can be easily controlled according to design specification.

Another object of the present invention is to provide a core, a transformer, a power converting apparatus, and a photovoltaic module, the core which is capable of reducing the size of a transformer in the photovoltaic module.

Yet another object of the present invention is to provide a transformer, a power converting apparatus, and a photovoltaic module, the transformer in which a leakage inductor and a transformer are integrated.

A core according to an embodiment of the present invention to achieve the above objects includes: a base; outer wall formed on the base; a first protruding member protruding on the base and disposed within the outer wall; and a second protruding member protruding on the base, disposed within the outer wall, and separated from the first protruding member, wherein a length of an edge of the second protruding member opposing the first protruding member is less than an outer circumference of the first protruding member.

The first protruding member may have a circular shape, and the length of the edge of the second protruding member opposing the first protruding member may be preferably less than a half of the outer circumference of the first protruding member.

A protruding height of the first protruding member may be preferably less than a protruding height of the second protruding member.

A gap between the first protruding member and the second protruding member may preferably increase from a central area toward a side area of the second protruding member.

The first protruding member may have a circular shape, and the second protruding member may have a curved shape.

A gap between the first protruding member and the second protruding member may be constant.

The base, the outer wall, the first protruding member, and the second protruding member may be formed of a same material.

A transformer according to an embodiment of the present invention includes: a core, wherein the core comprises a base, outer wall formed on the base, a first protruding member protruding on the base and disposed within the outer wall, and a second protruding member protruding on the base, disposed within the outer wall, and separated from the first protruding member; a first bobbin surrounding the first protruding member in the core; and a second bobbin surrounding the first protruding member and the second protruding member in the core, wherein a length of an edge of the second protruding member opposing the first protruding member is less than an outer circumference of the first protruding member.

The transformer may further include: a first wire wound around the first bobbin; and a second wire wound around the second bobbin.

A first opening and a second opening opposing each other may be formed in the outer wall of the core, and the transformer may further include: a first connection part and a second connection part disposed in a direction of the first opening and electrically connected to the first wire; and a third connection part and a fourth connection part disposed in a direction of the second opening and electrically connected to the second wire.

The transformer may further include a connection member connecting the first bobbin and the second bobbin.

A height of the first bobbin or the second bobbin may be preferably greater than a height of the first protruding member.

The first bobbin and the second bobbin may be attachable to and detachable from the core.

The transformer may further include a second core disposed between the first bobbin and the second bobbin along with the core, wherein the second core comprises: a second base; second outer wall formed on the second base; a third protruding member protruding on the second base and disposed within the second outer wall; and a fourth protruding member protruding on the second base, disposed within the second outer wall, and separated from the third protruding member, and wherein a length of an edge of the fourth protruding member opposing the third protruding member is less than an outer circumference of the third protruding member.

A protruding height of the third protruding member and a protruding height of the fourth protruding member may be equal.

A power converting apparatus and a photovoltaic module including the same according to an embodiment of the present invention include: a core; a first bobbin surrounding the first protruding member in the core; and a second bobbin surrounding the first protruding member and the second protruding member in the core, wherein the core comprises a base, outer wall formed on the base, a first protruding member protruding on the base and disposed within the outer wall, and a second protruding member protruding on the base, disposed within the outer wall, and separated from the first protruding member, and wherein a length of an edge of the second protruding member opposing the first protruding member is less than an outer circumference of the first protruding member.

A core according to an embodiment of the present invention includes: a base; outer wall formed on the base; a first protruding member protruding on the base and disposed within the outer wall; and a second protruding member protruding on the base, disposed within the outer wall, and separated from the first protruding member, wherein a length of an edge of the second protruding member opposing the first protruding member is less than an outer circumference of the first protruding member. Accordingly, the second protruding member may be machined so easily that a leakage inductance can be easily controlled according to design specification.

In particular, the first protruding member may have a circular shape, and the length of the edge of the second protruding member opposing the first protruding member may be preferably less than a half of the outer circumference of the first protruding member. Accordingly, the second protruding member may be machined so easily that a leakage inductance can be easily controlled according to design specification.

A protruding height of the first protruding member may be preferably less than a protruding height of the second protruding member. Accordingly, a leakage inductance caused by a difference in height between the second protruding member and the first protruding member may be easily controlled.

A gap between the first protruding member and the second protruding member may preferably increase from a central area toward a side area of the second protruding member. Accordingly, a wire may be wound easily.

The first protruding member may have a circular shape, and the second protruding member may have a curved shape. Accordingly, a wire may be wound easily.

A gap between the first protruding member and the second protruding member may be constant. Accordingly, a wire may be wound easily.

The base, the outer wall, the first protruding member, and the second protruding member may be formed of a same material. Accordingly, the core may be manufactured easily by molding.

A transformer according to an embodiment of the present invention includes: a core; a first bobbin surrounding the first protruding member in the core; and a second bobbin surrounding the first protruding member and the second protruding member in the core, wherein the core comprises a base, outer wall formed on the base, a first protruding member protruding on the base and disposed within the outer wall, and a second protruding member protruding on the base, disposed within the outer wall, and separated from the first protruding member, and wherein a length of an edge of the second protruding member opposing the first protruding member is less than an outer circumference of the first protruding member. Accordingly, the second protruding member may be machined so easily that a leakage inductance can be easily controlled according to design specification. In addition, it is possible to implement a transformer in which a leakage inductor and the transformer are integrated, and as a result, size of the transformer may be reduced.

A first opening and a second opening opposing each other may be formed in the outer wall of the core, and the transformer may further include: a first connection part and a second connection part disposed in a direction of the first opening and electrically connected to the first wire; and a third connection part and a fourth connection part disposed in a direction of the second opening and electrically connected to the second wire. Accordingly, it is possible to be electrically connected to an external circuit element.

The transformer may further include a connection member connecting the first bobbin and the second bobbin. Accordingly, it is possible to maintain a shape of the first bobbin and a shape of the second bobbin.

A height of the first bobbin or the second bobbin may be preferably greater than a height of the first protruding member. Accordingly, the first bobbin or the second bobbin may be covered by the second core.

The first bobbin and the second bobbin may be attachable to and detachable from the core. Accordingly, the transformer may be manufactured easily.

The transformer may further includes a second core disposed between the first bobbin and the second bobbin along with the core, wherein the second core comprises: a second base; second outer wall formed on the second base; a third protruding member protruding on the second base and disposed within the second outer wall; and a fourth protruding member protruding on the second base, disposed within the second outer wall, and separated from the third protruding member, and wherein a length of an edge of the fourth protruding member opposing the third protruding member is less than an outer circumference of the third protruding member. Accordingly, the first bobbin or the second bobbin may be covered by the second core, and therefore, an integrated transformer of a low height may be manufactured.

A power converting apparatus and a photovoltaic module including the same according to an embodiment include: a core; a first bobbin surrounding the first protruding member in the core; and a second bobbin surrounding the first protruding member and the second protruding member in the core, wherein the core comprises a base, outer wall formed on the base, a first protruding member protruding on the base and disposed within the outer wall, and a second protruding member protruding on the base, disposed within the outer wall, and separated from the first protruding member, and wherein a length of an edge of the second protruding member opposing the first protruding member is less than an outer circumference of the first protruding member. Accordingly, the second protruding member may be machined so easily that a leakage inductance can be easily controlled according to design specification. In addition, the first bobbin or the second bobbin may be covered by the second core, and therefore, size of the transformer may be reduced.

BRIEF DESCRIPTION OF THE DRAWINGS

The embodiments will be described in detail with reference to the following drawings in which like reference numerals refer to like elements wherein:

FIG. 2 is a front view of the photovoltaic module according to an embodiment of the present invention;

DETAILED DESCRIPTION OF THE PREFERRED EMBODIMENTS

The present specification proposes an integrated transformer which is machinable so easily that a leakage inductance can be easily controlled according to design specification.

Hereinafter, the present invention will be described in detail with reference to the accompanying drawings.

In the following description, the suffixes "module" and "unit" of elements herein are used for convenience of description and need not have any distinguishable meanings or functions. Accordingly, the suffixes "module" and "unit" can be used interchangeably.

Figure 1A:
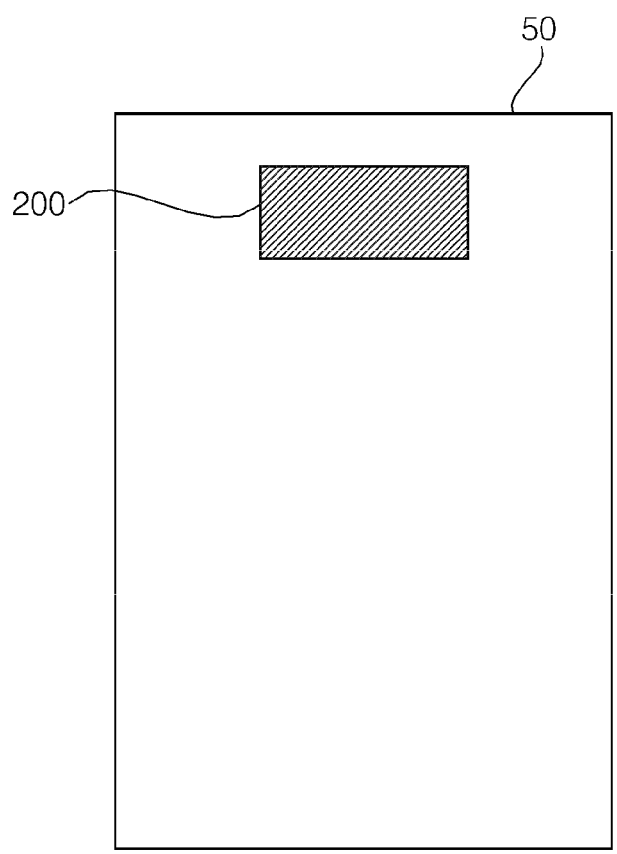
FIG. 1A is a diagram showing an example of a photovoltaic module according to an embodiment of the present invention.

FIG. 1A is a diagram showing an example of a photovoltaic module according to an embodiment of the present invention.

Referring to the drawing, a photovoltaic module 50 according to an embodiment of the present invention may include a solar cell module 100, and a junction box 200 including a power converting apparatus 500 (see FIG. 6) for converting DC power from the solar cell module and outputting converted power.

FIG. 1 shows the case where the junction box 200 is attached to a rear surface of the solar cell module 100, but aspects of the present invention are not limited thereto. The junction box 200 may be separated from and provided separately from the solar cell module 100.

Meanwhile, the power converting apparatus 500 (see FIG. 6) in the photovoltaic module 50 may convert DC power output from the solar cell module 100 into AC power, and output the AC power.

To this end, a converter 530 (see FIG. 6) and an inverter 540 (see FIG. 6) may be provided in the power converting apparatus 500 (see FIG. 6) of the photovoltaic module 50.

Meanwhile, the converter 530 in the power converting apparatus 500 (See FIG. 6) may include a leakage inductor.

In particular, to make the power converting apparatus 500 (see FIG. 6) compact, the present invention proposes an integrated transformer in which a transformer and a leakage inductor are integrated. In this case, in order to control the leakage inductance in the integrated transformer according to design specification, an easily machinable shape of a core is proposed. A detailed description thereof will be provided with reference to FIG. 9.

Figure 1B:
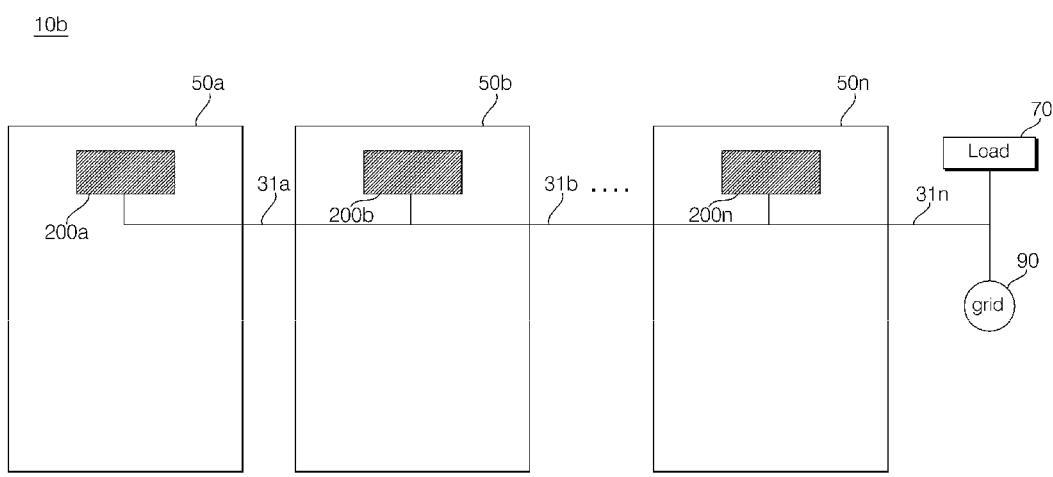
FIG. 1B is a diagram showing an example of a photovoltaic system including a photovoltaic module according to an embodiment of the present invention.

FIG. 1B is a diagram showing an example of a photovoltaic system including a photovoltaic module according to an embodiment of the present invention.

Referring to the drawing, a photovoltaic system 10b according to an embodiment of the present invention may include a plurality of photovoltaic modules 50a, 50b, . . . , 50n.

Meanwhile, the photovoltaic system 10b according to an embodiment of the present invention may further include a grid 90 or a load 70.

According to the photovoltaic system 10b shown in FIG. 1B, a plurality of photovoltaic modules 50a, 50b, . . . , 50n connected in parallel to each other.

The plurality of photovoltaic modules 50a, 50b, . . . , 50n may respectively include solar cell modules 100a, 100b, . . . , 100n, and junction boxes 200a, 200b, . . . , 200n for converting DC power from the respective solar cell modules and outputting converted power.

FIG. 1B shows the case where the junction boxes 200a, 200b, . . . , 200n are attached to rear surfaces of the respective solar cell modules 100a, 100b, . . . , 100n, but aspects of the present invention are not limited thereto. The junction boxes 200a, 200b, . . . , 200n may be separated from and provided separately from the respective solar cell modules 100a, 100b, . . . , 100n.

Meanwhile, cables 31a, 31b, . . . , 31n for supplying AC power from the respective junction boxes 200a, 200b, . . . , 200n to the grid 90 or to the load 70 may be electrically connected to output terminals of the respective junction boxes 200a, 200b, . . . , 200n.

Meanwhile, the plurality of photovoltaic modules 50a, 50b, . . . , 50n in FIG. 1B may include power converting apparatuses, respectively. According to an embodiment of the present invention, each power converting apparatus may include an integrated transformer.

Figure 3:
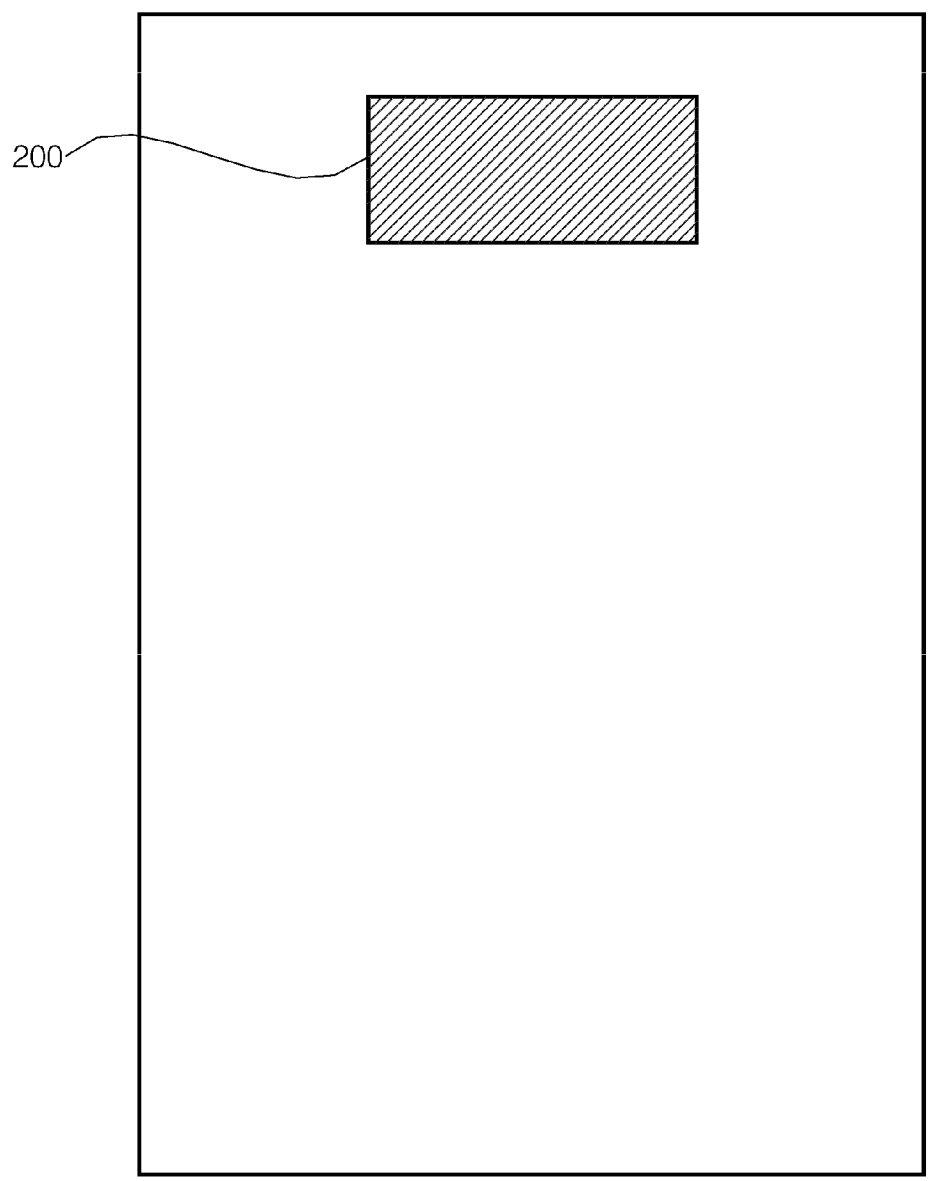
FIG. 3 is a rear view of the photovoltaic module of FIG. 2.

FIG. 2 is a front view of the photovoltaic module according to an embodiment of the present invention and FIG. 3 is a rear view of the photovoltaic module of FIG. 2.

Referring to the drawing, the photovoltaic module 50 according to an embodiment of the present invention can include the solar cell module 100 and the junction box 200 provided on the rear side of the solar cell module 100.

The junction box 200 can include at least one bypass diode for preventing a hot spot in the case of occurrence of a shading.

Figure 4:
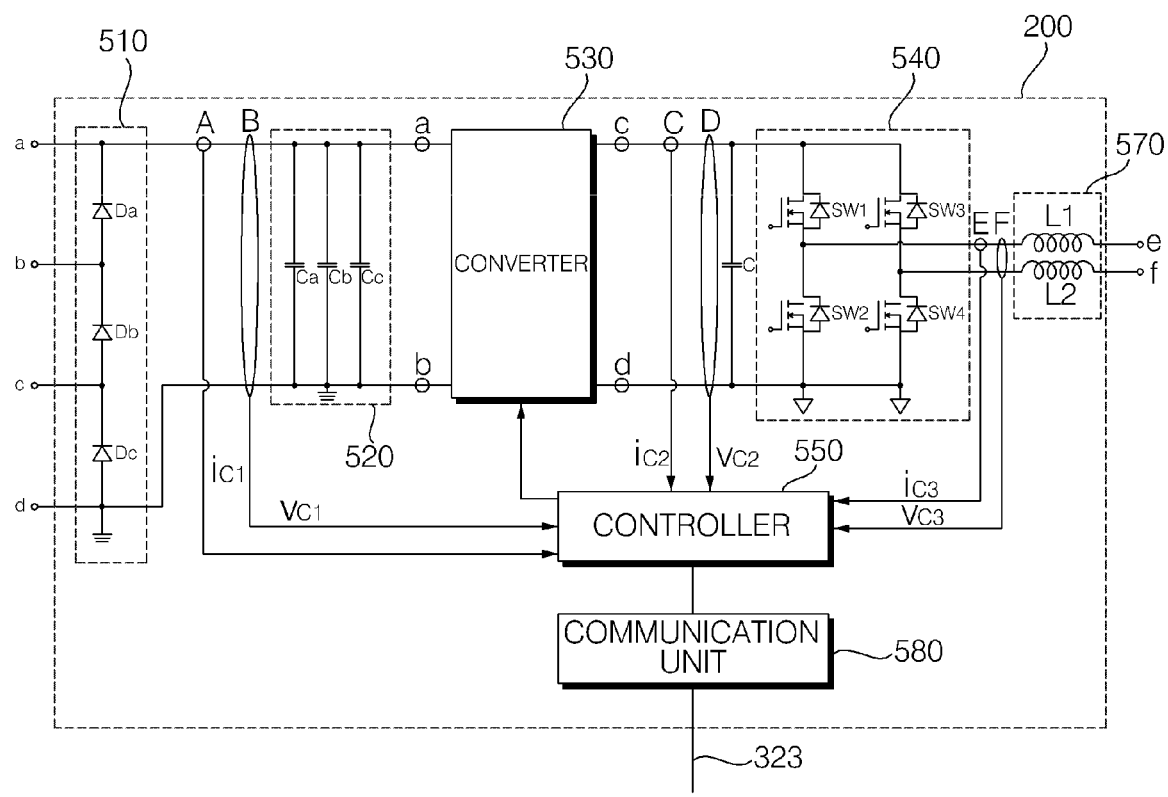
FIG. 4 is a diagram showing an internal circuit of the junction box in the photovoltaic module of FIG. 2.

FIG. 4 shows that a junction box includes three bypass diodes Da, Db and Dc corresponding to four solar cell strings of FIG. 2.

Meanwhile, the junction box 200 can convert DC power supplied from the solar cell module 100. This will be described with reference to FIG. 4 and the following figures.

The solar cell module 100 can include a plurality of solar cells.

The solar cells are connected in a line by means of a ribbon (133 in FIG. 12) to form solar cell strings 140. In this manner, six strings 140a, 140b, 140c, 140d, 140e and 140f are formed and each string includes ten solar cells, for example. Arrangement of solar cells can be modified in various manners from that shown in the figure.

The solar cell strings can be electrically connected through bus ribbons. FIG. 2 shows that the first solar cell string 140a is electrically connected to the second solar cell string 140b, the third solar cell string 140c is electrically connected to the fourth solar cell string 140d, and the fifth solar cell string 140e is electrically connected to the sixth solar cell string 140f through bus ribbons 145a, 145c and 145e arranged at the lower part of the solar cell module 100, respectively.

In addition, FIG. 2 shows that the second solar cell string 140b is electrically connected to the third solar cell string 140c and the fourth solar cell string 140d is electrically connected to the fifth solar cell string 140e through bus ribbons 145b and 145d arranged at the upper part of the solar cell module 100, respectively.

The ribbon connected to the first solar cell string 140a, the bus ribbons 145b and 145d, and the ribbon connected to the fourth solar cell string 140d are respectively electrically connected to first to fourth conductive lines, and the first to fourth conductive lines can be connected to the bypass diodes (Da, Db and Dc in FIG. 4) in the junction box 200 provided on the rear side of the solar cell module 100 through an opening formed in the solar cell module 100.

Here, the opening formed in the solar cell module 100 can be formed to correspond to the region in which the junction box 200 is positioned.

FIG. 4 is a diagram showing an internal circuit of the junction box in the photovoltaic module of FIG. 2.

Referring to the drawing, the junction box 200 can convert DC power from the solar cell module 100 and output the converted power.

Particularly, the junction box 200 according to the present invention can include a power converting apparatus for outputting AC power.

To this end, the junction box 200 can include the converter 530, the inverter 540 and the controller 550 for controlling the same.

In addition, the junction box 200 can further include a bypass diode unit 510 for bypass, a capacitor unit 520 for storing DC power, and a filter 570 for filtering output AC power.

Meanwhile, the junction box 200 may further include a communication unit 580 for communication with a grid 90 or a load 70 in the outside or with a different junction box.

Further, the junction box 200 can further include an input current detector A, an input voltage detector B, a converter output current detector C, a converter output voltage detector D, an inverter output current detector E and an inverter output voltage detector F.

The controller 550 can control the converter 530, the inverter 540, and the communication unit 580.

The bypass diode unit 510 can include the bypass diodes Dc, Db and Da arranged between the first to fourth conductive lines of the solar cell module 100. Here, the number of bypass diodes is one or more, for example, less than the number of conductive lines by one.

The bypass diodes Dc, Db and Da receive photovoltaic DC power from the solar cell module 100, particularly, from the first to fourth conductive lines in the solar cell module 100. When a reverse voltage is generated in DC power from at least one of the first to fourth conductive lines, the bypass diodes Dc, Db and Da can bypass the DC power.

DC power which has passed through the bypass diode unit 510 can be input to the capacitor unit 520.

The capacitor unit 520 can store the DC power input through the solar cell module 100 and the bypass diode unit 510.

Although the figure shows that the capacitor unit 520 includes a plurality of capacitors Ca, Cb and Cc connected in parallel, a plurality of capacitors can be connected in series and parallel or connected in series to a ground terminal. Alternatively, the capacitor unit 520 can include only one capacitor.

The converter 530 can convert the level of an input voltage from the solar cell module 100, which has passed through the bypass diode unit 510 and the capacitor unit 520.

Particularly, the converter 530 can perform power conversion using DC power stored in the capacitor unit 520.

The converter 530 according to an embodiment of the present invention will be described in more detail with reference to FIG. 6.

Switching elements in the converter 530 can be turned on/off based on a converter switching control signal from the controller 550. Accordingly, level-converted DC power can be output.

The inverter 540 can convert the DC power converted by the converter 530 into AC power.

The figure shows a full-bridge inverter. That is, upper arm switching elements Sa and Sb connected in series and lower arm switching elements S'a and S'b connected in series are paired, and the two pairs of upper and lower arm switching elements Sa, S'a, Sb, and S'b are connected in parallel. A diode can be connected in anti-parallel with each switching element Sa, S'a, Sb, and S'b.

The switching elements Sa, S'a, Sb, and S'b in the inverter 540 can be turned on/off based on an inverter switching control signal from the controller 550. Accordingly, AC power having a predetermined frequency can be output. Desirably, AC power having the same frequency (about 60 Hz or 50 Hz) as the AC frequency of the grid is output.

The capacitor C can be disposed between the converter 530 and the inverter 540.

The capacitor C can store the DC power having the level converted by the converter 530. Both terminals of the capacitor C can be called DC terminals and thus the capacitor C can be called a DC-terminal capacitor.

The input current detector A can detect input current ic1 supplied from the solar cell module 100 to the capacitor unit 520.

The input voltage detector B can detect an input voltage Vc1 supplied from the solar cell module 100 to the capacitor unit 520. Here, the input voltage Vc1 can be the same as the voltage stored in the capacitor unit 520.

The detected input current ic1 and input voltage vc1 can be input to the controller 550.

The converter output current detector C detects output current ic2 from the converter 530, that is, DC-terminal current, and the converter output voltage detector D detects an output voltage vc2 from the converter 530, that is, a DC-terminal voltage. The detected output current ic2 and output voltage vc2 can be input to the controller 550.

The inverter output current detector E detects current ic3 output from the inverter 540 and the inverter output voltage detector F detects a voltage vc3 output from the inverter 540. The detected current ic3 and voltage vc3 are input to the controller 550.

The controller 550 can output control signals for controlling the switching elements of the converter 530. Particularly, the controller 550 can output a turn-on timing signal of the switching elements included in the converter 530 based on at least one of the detected input current ic1, input voltage vc1, output current ic2, output voltage vc2, output current ic3 and output voltage vc3.

Further, the controller 550 can output inverter control signals for controlling the switching elements Sa, S'a, Sb, and S'b of the inverter 540. Particularly, the controller 550 can output a turn-on timing signal of the switching elements Sa, S'a, Sb, and S'b of the inverter 540 based on at least one of the detected input current ic1, input voltage vc1, output current ic2, output voltage vc2, output current ic3 or output voltage vc3.

Further, the controller 550 can calculate a maximum power point with respect to the solar cell module 100 and control the converter 530 to output DC power corresponding to maximum power according thereto.

Meanwhile, the communication unit 580 may perform communication with the grid 90 or the load 70 in the outside or with a different junction box.

For example, through power line communication, the communication unit 580 may exchange data with the communication unit 580 to communicate with the grid 90 or the load 70 in the outside or with a different junction box.

Meanwhile, the communication unit 580 may transmit current information, voltage information, power information, and the like regarding the photovoltaic module 50 to the communication unit 580 for communication with the grid 90 or the load in the outside or for communication with a different junction box.

The filter 570 can be disposed at the output terminals of the inverter 540.

In addition, the filter 570 can include a plurality of passive elements and control a phase difference between an AC current io and an AC voltage vo output from the inverter 540 based on at least some of the plurality of passive elements.

Figure 5A:
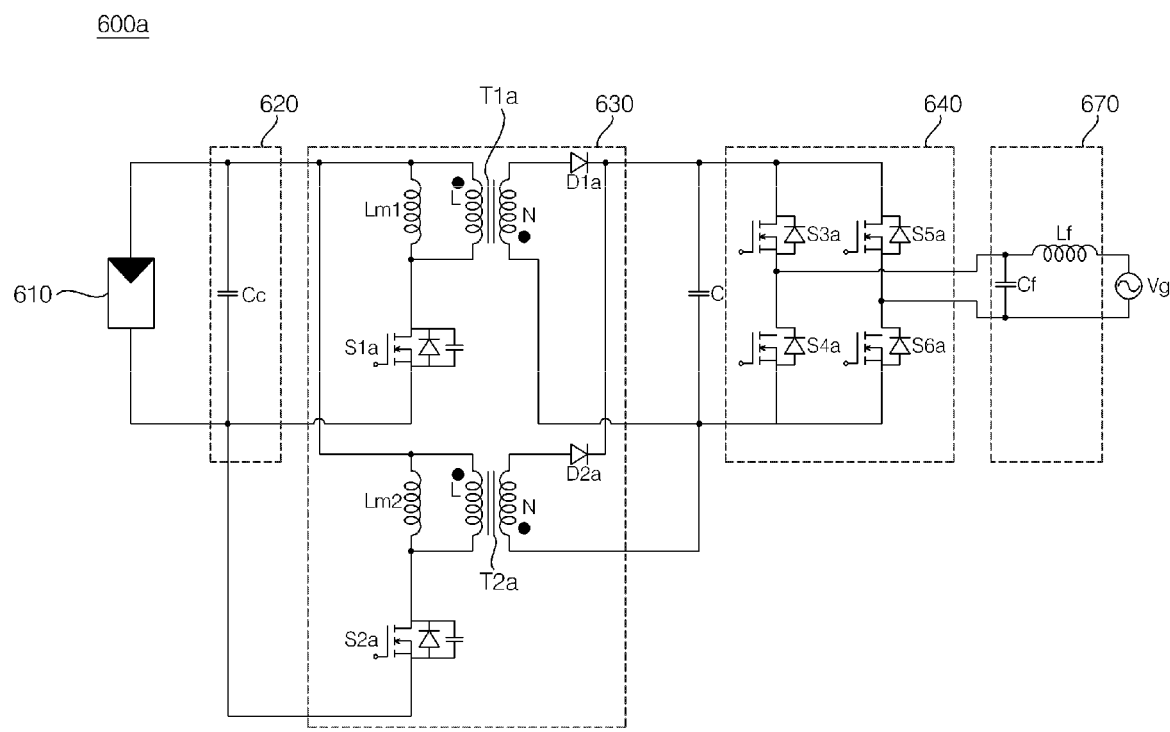
FIGS. 5A and 5B are various examples of a power converting apparatus of a photovoltaic module.
Figure 5B:
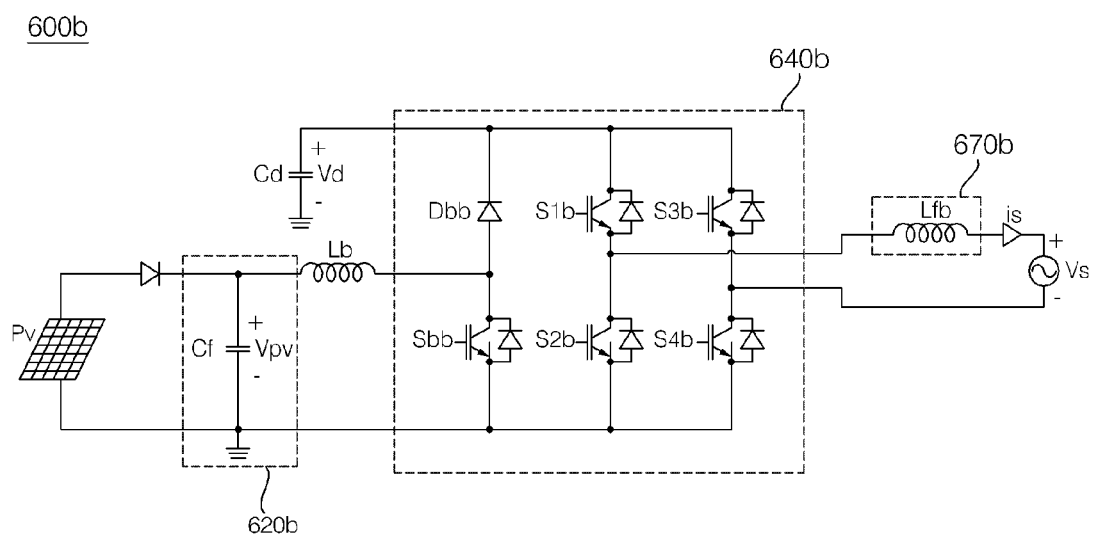

FIGS. 5A and 5B are various examples of a power converting apparatus of a photovoltaic module.

A power converting apparatus 600a of a photovoltaic module in FIG. 5A includes a capacitor unit 620, a converter 630, an inverter 640, and a filter unit 670.

The converter 630 in FIG. 5A includes an interleaved fly back converter, which uses transformers T1a and T1b and therefore an input side and an output side are insulated and an excellent voltage conversion ratio is achieved, but it is difficult to control a power factor pf.

Next, a power converting apparatus 600b of a photovoltaic module in FIG. 5B includes a capacitor unit 620b, a power converting unit 640b, and a filter unit 670b.

The power converting unit 640b in FIG. 5B includes a diode Dbb and a switching element Sbb in addition to switching elements S1b to S4b related to a full bridge inverter.

The power converting unit 640b in FIG. 5B is capable of controlling a power factor pf, but it is a non-insulation type and thus has a low voltage conversion ratio. In addition, in order to satisfy a requirement regarding a leakage current, an additional protection circuit and the like are necessary. In addition, when switching is performed, a hard switching loss occurs due to hard switching, thereby resulting in low power conversion efficiency.

Meanwhile, the present invention suggests a method that enables a power converting apparatus to outputting stable power. In addition, a method for reducing a loss of output currents is suggested.

Figure 6:
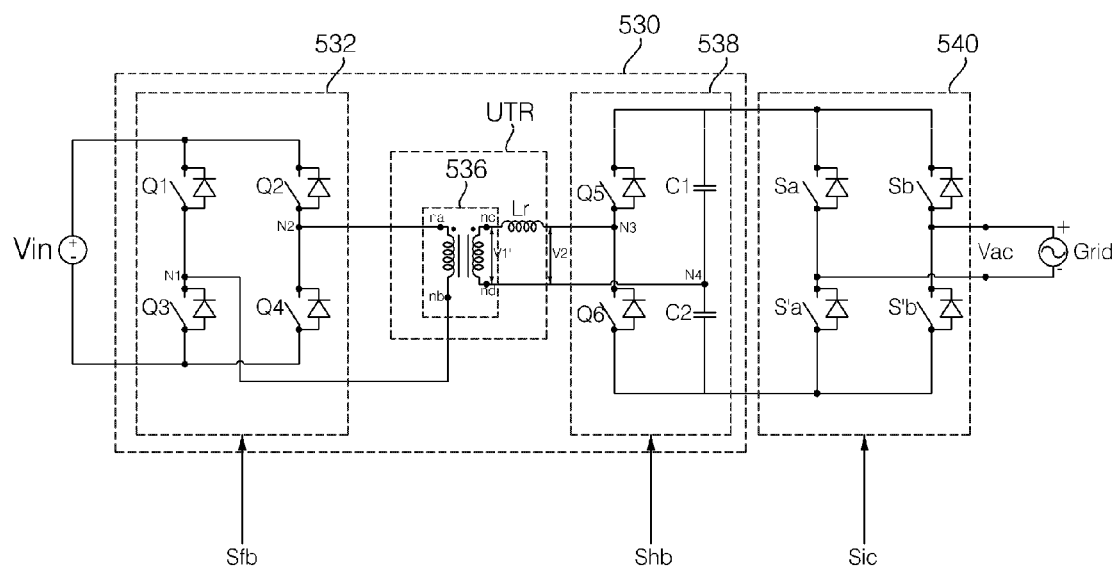
FIG. 6 is a diagram showing a circuit of a power converting apparatus in a photovoltaic module according to an embodiment of the present invention.
Figure 7A:
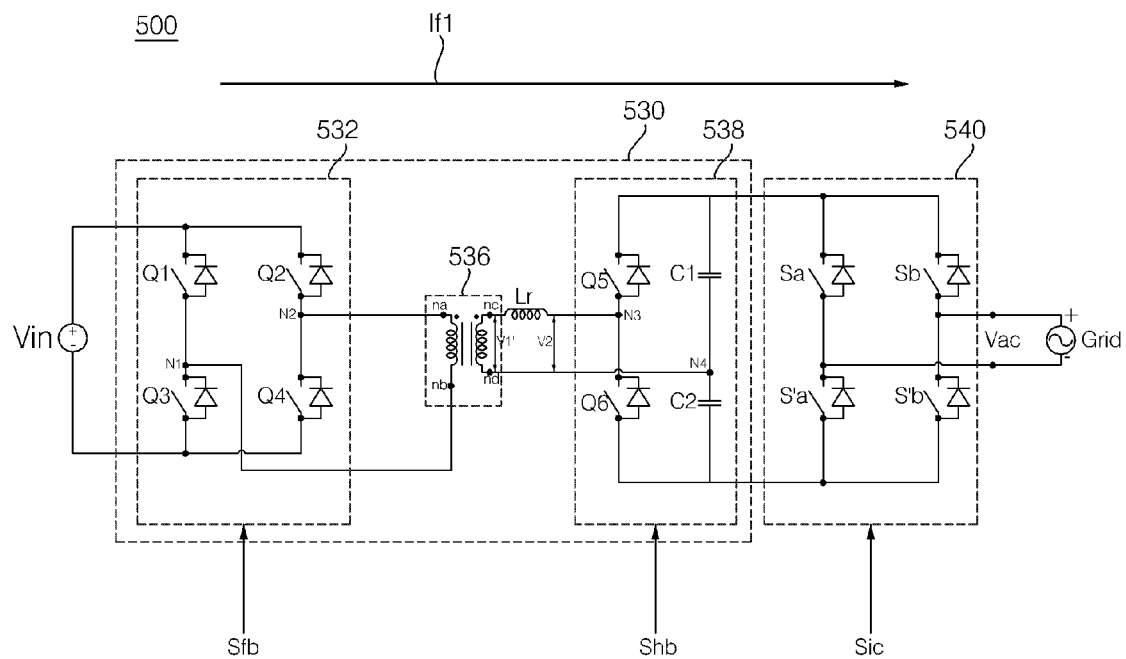
FIGS. 7A and 7B are diagrams referred to in the description of the power converting apparatus shown in FIG. 6.
Figure 7B:
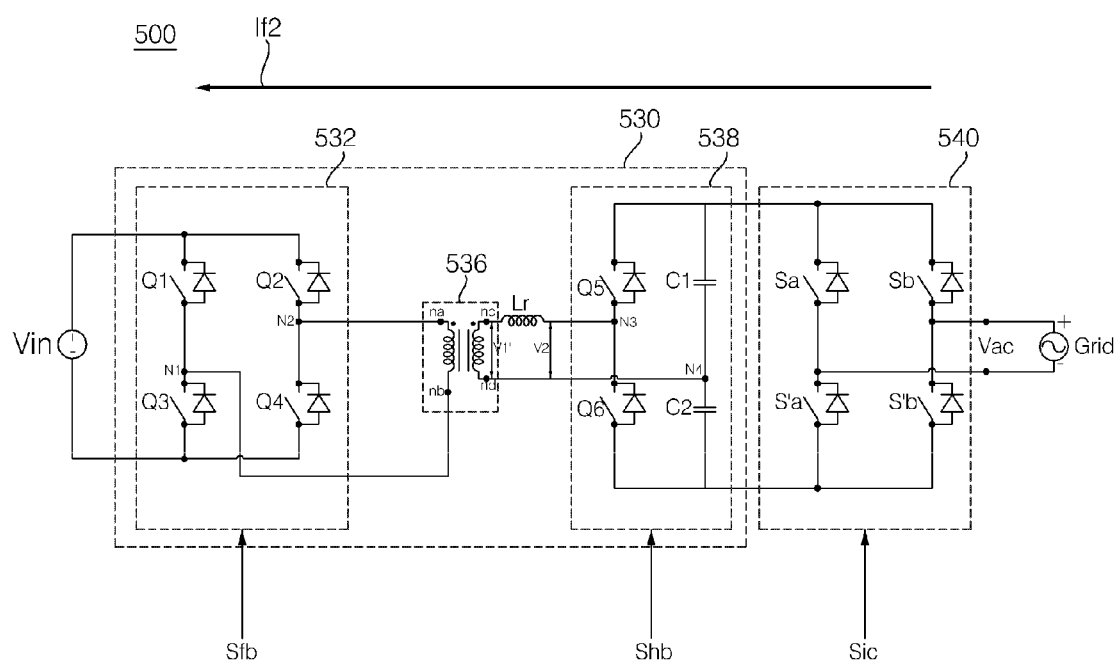

FIG. 6 is a diagram showing a circuit of a power converting apparatus in a photovoltaic module according to an embodiment of the present invention, and FIGS. 7A and 7B are diagrams referred to in the description of the power converting apparatus shown in FIG. 6.

Referring to the drawings, in addition to the converter 530 and the inverter 540, a power converting apparatus 500 in a photovoltaic module 100 according to an embodiment of the present invention may include a diode unit 510, a capacitor unit 520, a controller 550, a communication unit 580, an input current detector A, an input voltage detector B, a converter output current detector C, a converter output voltage detector D, an inverter output current detector E, and an inverter output voltage detector F.

Meanwhile, a filter unit 570 may be further disposed at an output terminal of the inverter 540 to reduce electromagnetic noise. In this case, the filter unit 570 may include at least one inductor.

Hereinafter, FIG. 6 will be described mainly about the converter 530 and the inverter 540 shown in FIG. 6.

The power converting apparatus 500 in a photovoltaic module 100 according to an embodiment of the present invention may include a solar cell module 100 having a plurality of solar cells 130, a converter 530 for converting a level of first DC power Vin input from the solar cell module 100 and outputting second current voltage, an inverter 540 for converting DC power from the converter 530 into AC power Vac, and a controller 550 for controlling the converter 530 and the inverter 540.

Meanwhile, the converter 530 according to an embodiment of the present invention may include a full bridge switching unit 532 for switching of first DC power Vin, a transformer 536 having an input side na and nb connected to an output terminal of the bridge switching unit 532, and a half bridge switching unit 538 connected to an output side nc and nd of the transformer 536.

Meanwhile, the controller 550 is capable of controlling a switching frequency of the full bridge switching unit 532 and the half bridge switching unit 538 to vary during a first period Pba and Pbb. Accordingly, even in the case where DC power Vin from the solar cell module 100 is low, it is possible to output stable power without any limitation in a range of outputting power.

In addition, it is possible to reduce a switching loss in the power converting apparatus.

Meanwhile, the converter 530 in the power converting apparatus 500 of the photovoltaic module 100 may further include an inductor Lr between the transformer 536 and the half bridge switching unit 538.

In this case, an inductor Lr is necessary to deliver energy between the transformer 536 and the half bridge switching unit 538.

In particular, the inductor Lr may provide a leakage inductance and may be used for resonance in a resonance converter.

Meanwhile, to make the power converting apparatus 500 slim, the present invention proposes an integrated transformer module UTR in which the transformer 536 and the leakage inductor Lr are integrated. A detailed description thereof will be described later with reference to FIG. 9 and other drawings.

As shown in the drawing, the full bridge switching unit 532 may include first and second switching elements Q1 and Q2 connected in parallel to each other, and third and fourth switching elements Q3 and Q4 respectively connected in series to the first and second switching elements Q1 and Q2.

In addition, the input side na and nb of the transformer 536 may be connected between a first node N1, which is disposed between the first switching element Q1 and the second switching element Q2, and a second node N2, which is disposed between the third switching element Q3 and the fourth switching element Q4.

Meanwhile, as shown in the drawing, the half bridge switching unit 538 may include fifth and sixth switching element Q5 and Q6 connected in series to each other, and first and second capacitors C1 and C2 connected in series to each other.

In this case, the fifth switching element Q5, the sixth switching element Q6, the first capacitor C1, and the second capacitor C2 may be connected in parallel to each other.

In addition, the output side nc and nd of the transformer 536 may be connected between a third node N3, which is intermediate between the fifth switching element Q5 and the sixth switching element Q6, and a fourth node N4, which is intermediate between the first capacitor C1 and the second capacitor C2.

Meanwhile, the controller 550 may output a switching control signal Sfb for switching of the full bridge switching unit 532.

Meanwhile, the controller 550 may output a switching control signal Shb for switching of the half bridge switching unit 538.

Meanwhile, the controller 550 may output a switching control signal Sic for switching of the inverter 540.

Meanwhile, the controller 550 may control a switching frequency of the full bridge switching unit 532 and the half bridge switching unit 538 to vary according to a waveform of an output voltage Vac of the inverter 540.

FIG. 7A shows an example of a waveform in the case where a current flows from the converter 530 to the inverter 540, and FIG. 7B shows an example of a waveform in the case where a current flows from the inverter 540 to the converter 530. In this case, the inverter 540 may be a bidirectional inverter. Meanwhile, the converter 530 may be a bidirectional converter.

Meanwhile, for description of comparison with the integrated transformer shown in FIG. 6, a conventional transformer in FIGS. 8A and 8B will be described.

Figure 8A:
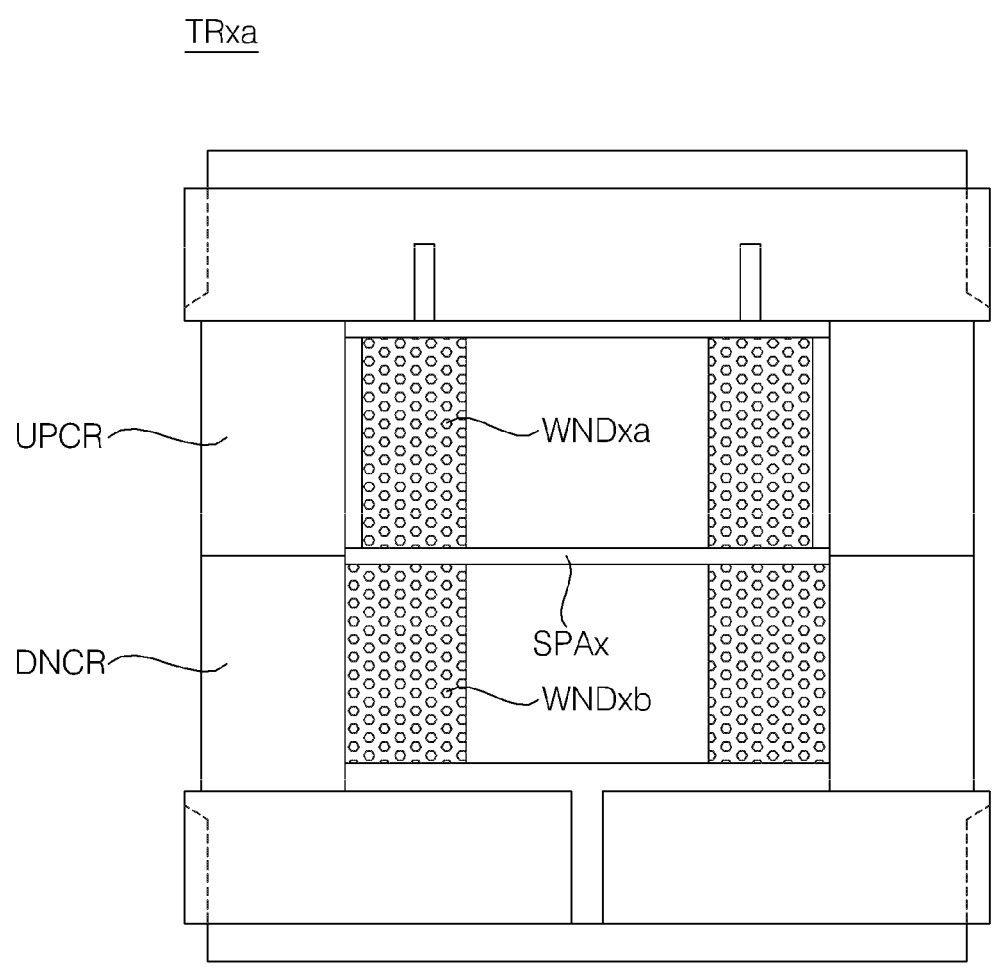
FIGS. 8A and 8B are diagrams referred to in the description of a transformer.
Figure 8B:
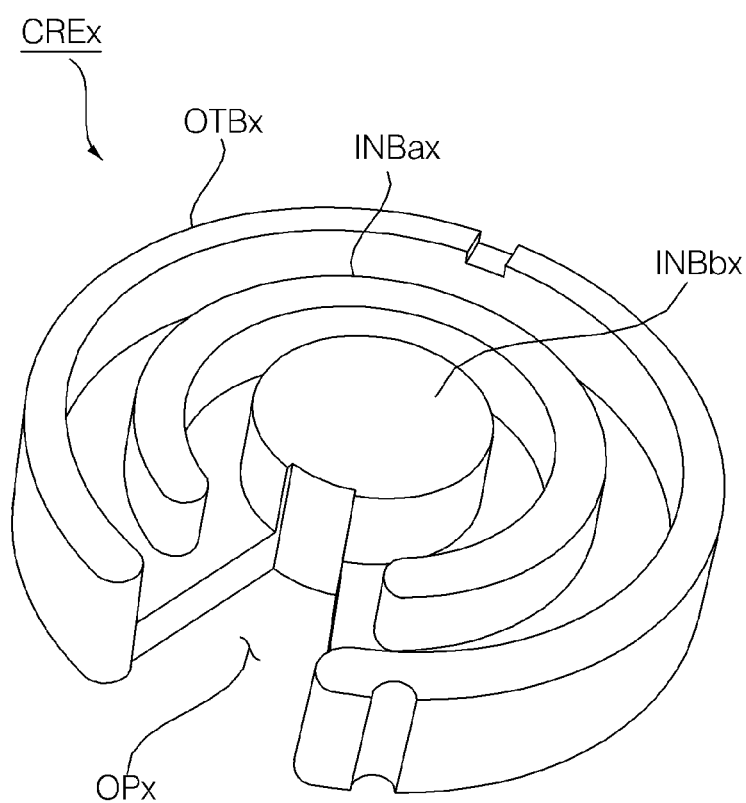

FIGS. 8A and 8B are diagrams referred to in the description of a transformer.

FIG. 8A shows an example of a general resonance transformer TRxa.

Referring to the drawings, the general resonance transformer TRxa is divided into an upper core UPCR, an upper wire WNDXa wound around a bobbin, a lower core DNCR, and a lower wire WNDXb wound around a bobbin. In this case, however, the core space in the middle is fixed and thus it is difficult to control a leakage inductance.

Next, FIG. 8B shows an example of an integrated transformer.

Referring to the drawing, an inner core CREx in the integrated transformer includes an outer wall OTBx, a circular inner wall INBbx in the outer wall OTBx, and a second circular inner wall INBax surrounding the circular inner wall INBbx. However, as the inner wall INBbx and the second inner wall INBax, which produce a leakage inductance, have a circular shape, easy machining is not allowed, and thus, it is not easy to control the leakage inductance according to design specification.

In addition, as an opening OPx is formed only at one side, a conductive line electrically connected to a wire should be arranged through the one opening OPx and therefore there is a high likelihood for a short circuit to occur.

Accordingly, a structure of an integrated transformer according to an embodiment of the present invention will be proposed in the following.

Figure 9:
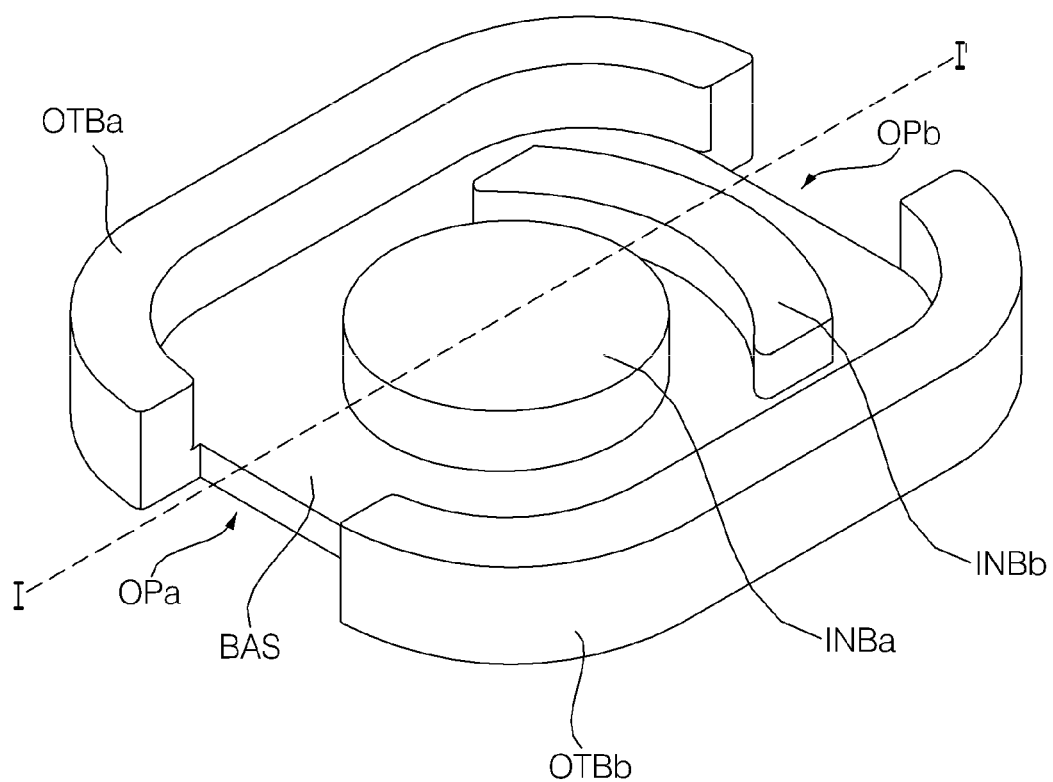
FIG. 9 is a diagram showing a core in an integrated transformer according to an embodiment of the present invention.

FIG. 9 is a diagram showing a core in an integrated transformer according to an embodiment of the present invention, and FIGS. 10A to 15C are diagrams referred to in the description of FIG. 9.

Referring to the drawings, a core CRE in the integrated transformer in FIG. 9 may include: a base BAS; outer walls OTBa and OTBb formed on the base BAS; a first protruding member INBa protruding on the base BAS and disposed within the outer walls OTBa and OTBb; and a second protruding member INBb protruding on the base BAS and disposed within the outer walls OTBa and OTBb and separated from the first protruding member INBa.

FIG. 9 shows an example in which openings OPa and OPb are formed between the outer walls OTBa and OTBb formed on the base BAS.

In the drawing, the second protruding member INBb is disposed in a direction of a second opening OPb that is one of the plurality of openings OPa and OPb.

An external conductive line may be received and drawn through the openings OPa and OPb, and may be electrically connected with a wire wound around bobbins BINB and BOTB mounted in the core CRE.

Meanwhile, in contrast to FIG. 9, a single opening rather than the plurality of openings OPa and OPb may be formed.

Meanwhile, FIG. 9 shows an example in which the first protruding member INBa has a circular shape, but the first protruding member INBa may be in an elliptical shape or the like. That is, the first protruding member INba may have any of various shapes to which the first bobbin BINB is capable of being attached.

Meanwhile, the base BAS, the outer walls OTBa and OTBb, the first protruding member INBA, and the second protruding member INBb in the core CRE may be formed of the same material. For example, the base BAS, the outer walls OTBa and OTBb, the first protruding member INBA, and the second protruding member INBb in the core CRE may be made of ferrite.

Meanwhile, in the case where the core CRE is made of a ferrite material, it is preferable to manufacture the core CRE using a molding technique or the like. Accordingly, the core CRE may be manufactured easily.

Meanwhile, in the integrated transformer UTR in which the transformer 536 and the leakage inductor Lr in FIG. 6 are integrated, it is necessary to micro-machine the second protruding member INBb in the core CRE, which is manufactured by a molding technique or the like, so that a leakage inductance of the leakage inductor Lr is produced according to design specification.

In particular, since the leakage inductance is determined by a height difference hdf (see FIG. 10B) between the first protruding member INBa and the second protruding member INBb, it is necessary to machine the height of the second protruding member INBb in the manufactured core CRE.

In this case, as shown in FIG. 8B, in the case where the inner core CREx includes the outer wall OTBx, a circular inner wall INBbx in the outer wall OTBx, and a second circular inner wall INBax surrounding the circular inner wall INBbx, it is difficult to micro-machine the second circular inner wall INBax.

Accordingly, for convenience of micro-machining the second protruding member INBb, the present invention is designed in a manner in which a length of an edge of the second protruding member INBb opposing the first protruding member INBa is less than an outer circumference of the first protruding member INBa. Accordingly, it is easy to machine the second protruding member INBb, thereby making it easy to control a leakage inductance according to design specification.

Figure 10A:
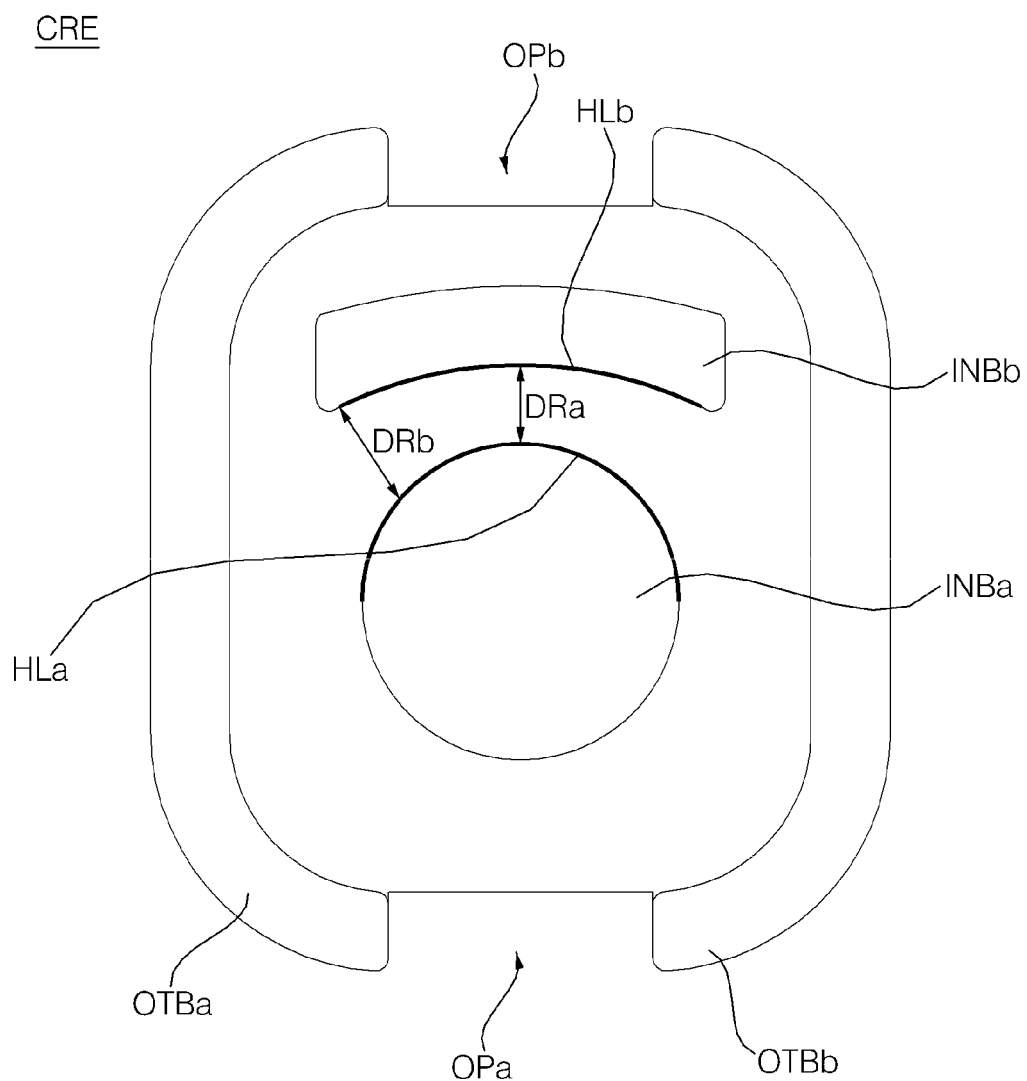
FIGS. 10A to 15C are diagrams referred to in the description of FIG. 9.

In particular, as shown in FIG. 10A, the first protruding member INBa in the core CRE according to an embodiment of the present invention has a circular shape, and it is preferable that a length HLb of an edge of the second protruding member INBb opposing the first protruding member INBa is less than a half HLa of the circumference of the first protruding member INBa. Accordingly, it is easy to machine the second protruding member INBb, thereby making it easy to control a leakage inductance according to design specification.

Meanwhile, it is preferable that the core CRE according to an embodiment of the present invention is configured to have a gap between the first protruding member INBa and the second protruding member INBb that increases from the central area to the side area of the second protruding member INBb.

FIG. 10A shows an example in which a gap between the first protruding member INBa and the second protruding member INBb in the central area is Dra, while a gap between the first protruding member INBa and the second protruding member INBb in the side area is DRb greater than Dra. Accordingly, a wire may be wound easily.

Meanwhile, the first protruding member INBa in the core CRE according to an embodiment of the present invention may have a circular shape, as shown in FIG. 10A, and the second protruding member INBb may have a curved shape. Accordingly, a wire may be wound easily.

Figure 10B:
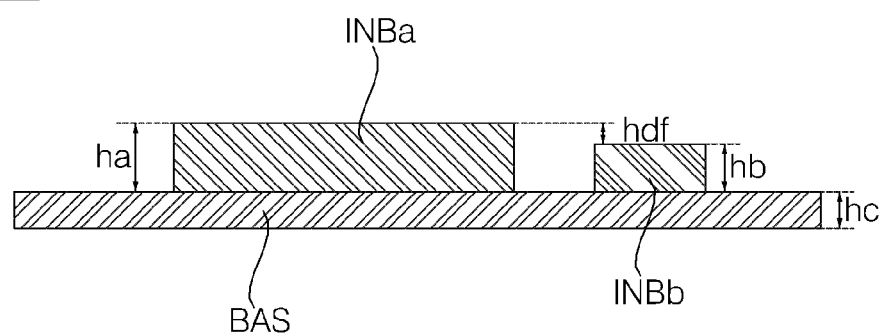

FIG. 10B is a cross-sectional view of FIG. 9 taken along line I-I'.

Referring to the drawing, a core CRE may include: a base BAS, outer walls OTBa and OTBb formed on the base BAS; a first protruding member INBa protruding on the base BAS and disposed within the outer walls OTBa and OTBb; and a second protruding member INBb protruding on the base BAS, disposed within the outer wall OTBa and OTBb, and separated from the first protruding member INBa.

In this case, it is preferable that a protruding height hb of the second protruding member INBb is less than a protruding height ha of the first protruding member INBa. Accordingly, a leakage inductance caused by a difference between the height hb of the second protruding member INBb and the height ha of the first protruding member INBa may be easily controlled.

Meanwhile, a height of the base BAS may be less than the protruding height hb of the second protruding member INBb. Accordingly, the overall height of the core CRE may be reduced and therefore a slim core CRE may be manufactured.

Figure 11A:
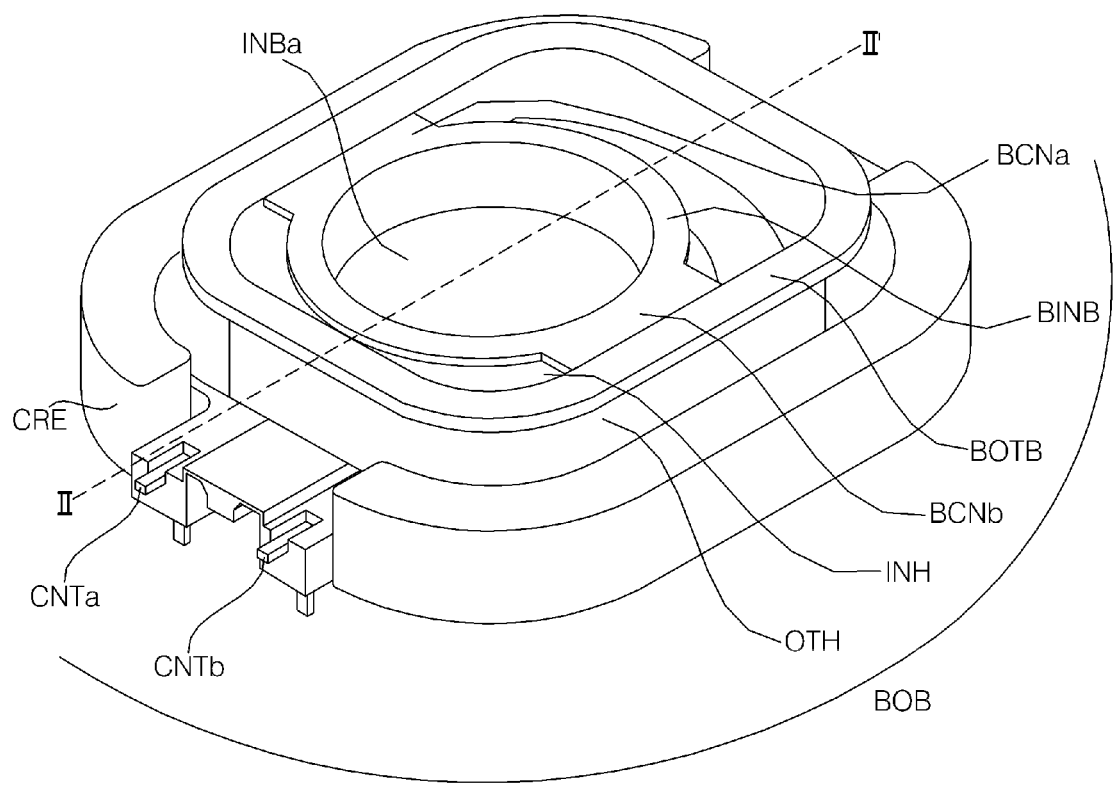

FIG. 11A is a diagram showing an example in which a bobbin structure BOB having a first bobbin and a second bobbin are attached to the core CRE in FIG. 9.

The bobbin structure BOB may include a first bobbin BINB surrounding the first protruding member INBa, a first protruding member INBa in the core CRE, and a second bobbin BOTB surrounding the second protruding member INBb.

Meanwhile, the bobbin structure BOB may further include a connection member BCNa and BCNb connecting the first bobbin BINB and the second bobbin BOTB. Accordingly, it is possible to maintain a shape of the first bobbin BINB and a shape of the second bobbin BOTB.

Figure 11B:
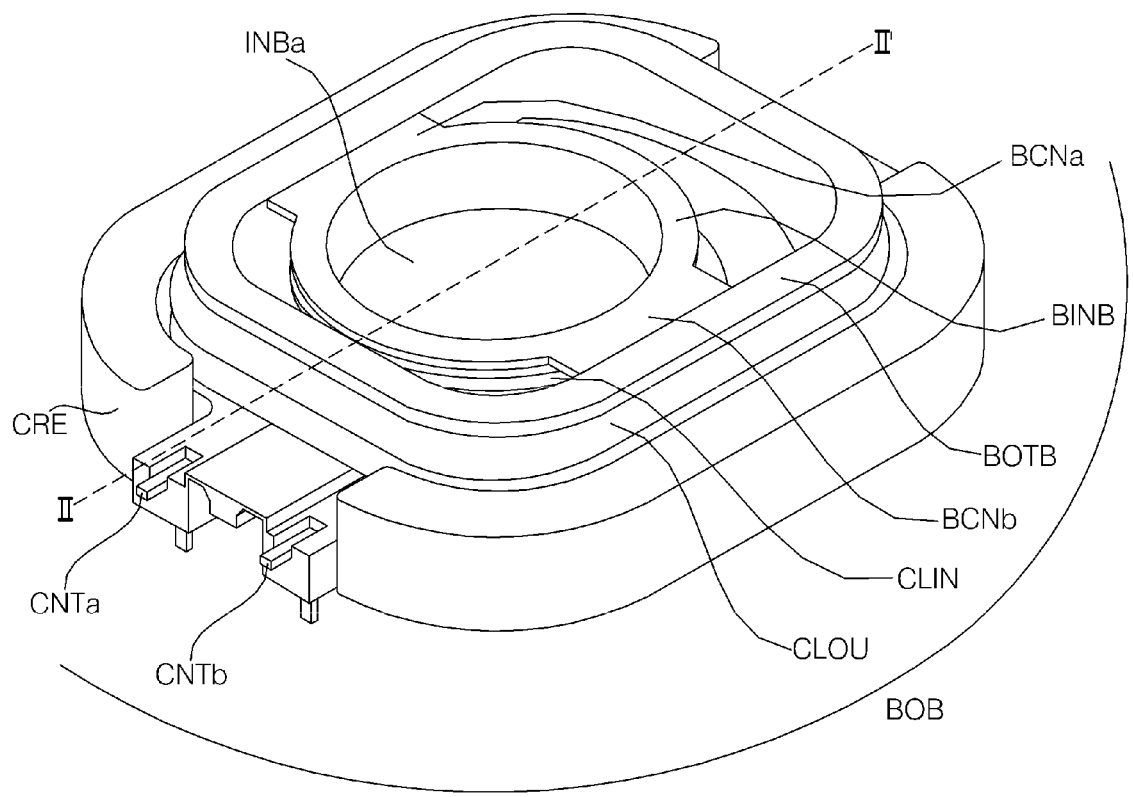

Meanwhile, as shown in FIG. 11B, a first wire CLIN may be wound in a groove INH formed in the first bobbin BINB, and a second wire CLOU may be wound in a groove in OTH formed in the second bobbin BOTB.

Meanwhile, the bobbin structure BOB may further include a first connection part CNTa and a second connection part CNTb disposed in a direction of the first opening OPa and electrically connected to the first wire CLIN, and a third connection part CNTc and a fourth connection part CNTd disposed in a direction of the second opening OPb and electrically connected to the second wire CLOU. Accordingly, it is possible to be electrically connected to an external circuit element.

Meanwhile, the first bobbin BINb and the second bobbin BOTB in the bobbin structure may be attachable to and detachable from the core CRE. Accordingly, it is easy to manufacture the transformer UTR.

Meanwhile, the first wire CLIN may correspond to a primary side of the transformer 536 in FIG. 6, and the second wire CLOU may correspond to a secondary side of the transformer 536 in FIG. 6.

Figure 12A:
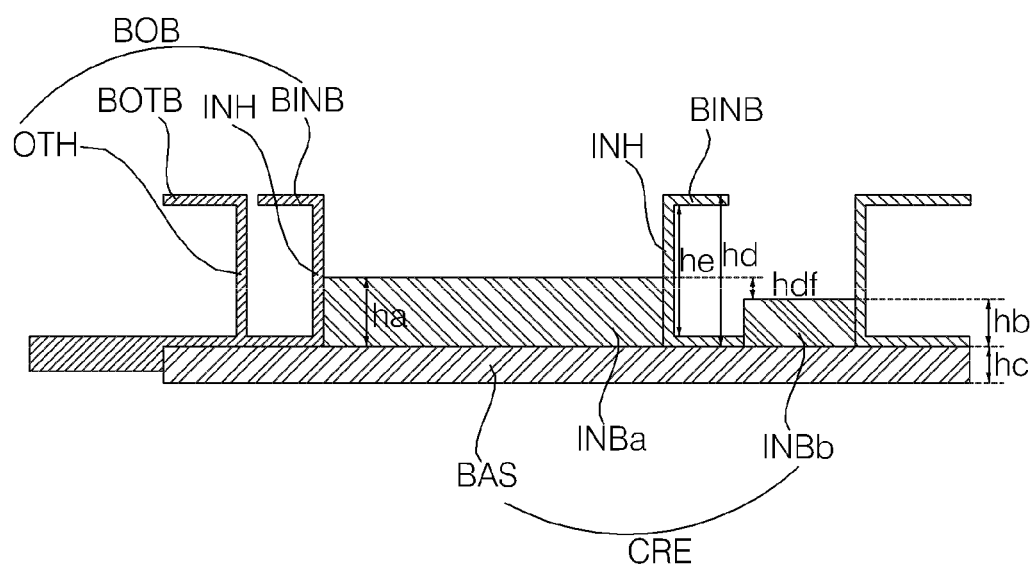

FIG. 12A is a cross-sectional view of FIG. 11a, taken along line II-II'.

Referring to the drawing, a description of the core CRE is omitted with reference to FIG. 10B, and the first bobbin BINB and the second bobbin BOTB will be described in the following.

The first bobbin BINB may surround the first protruding member INBa, and the second bobbin BOTB may surround the first protruding member INBa and the second protruding member INBb in the core CRE.

It is preferable that the height of the first bobbin BINB or the second bobbin BOTB is greater than the height of the first protruding member INBa. Accordingly, the first bobbin BINB or the second bobbin BOTB are thereafter covered by a second core CRE.

Figure 12B:
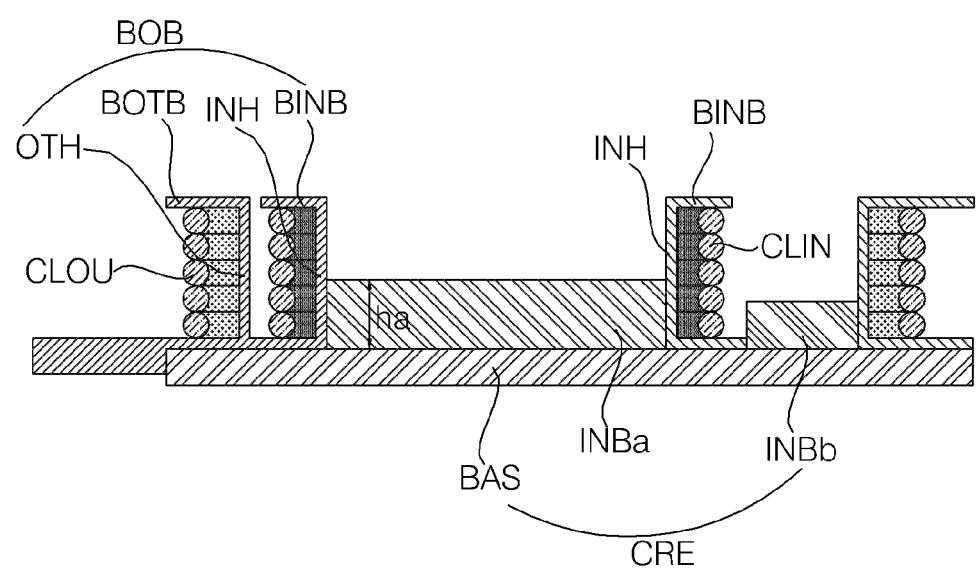

FIG. 12B is a cross-sectional view of FIG. 11B, taken along line II-II'.

Referring to the drawing, the first wire CLIN may be wound in the groove INH formed in the first bobbin BINB, and the second wire CLOU may be wound in the groove OTH formed in the second bobbin BOTB.

Referring to FIG. 12B, it is possible to control a leakage inductance with an air gap caused by a difference between a height of the second protruding member INBb and a height ha of the first protruding member INBa. Accordingly, it is possible to manufacture the integrated transformer UTR that has a leakage inductor suitable for design specification.

FIGS. 13A to 13D are diagrams showing the direction of currents and the direction of a magnetic flux in an integrated transformer UTR.

Figure 13A:
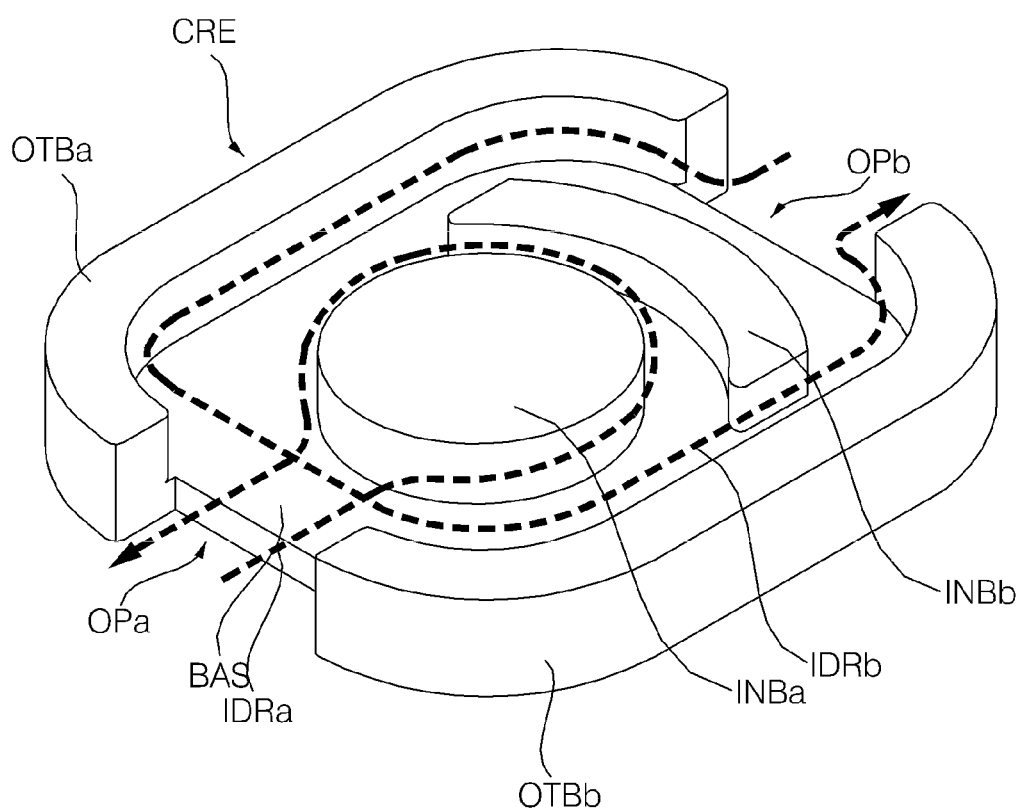

FIG. 13A shows an example in which a first wire CLIN is wound around a first bobbin BINB surrounding a first protruding member INBa in a counter-clockwise direction, while a second wire CLOU is wound around a second bobbin BOTB surrounding a second protruding member INBb in the counter-clockwise direction.

Figure 13B:
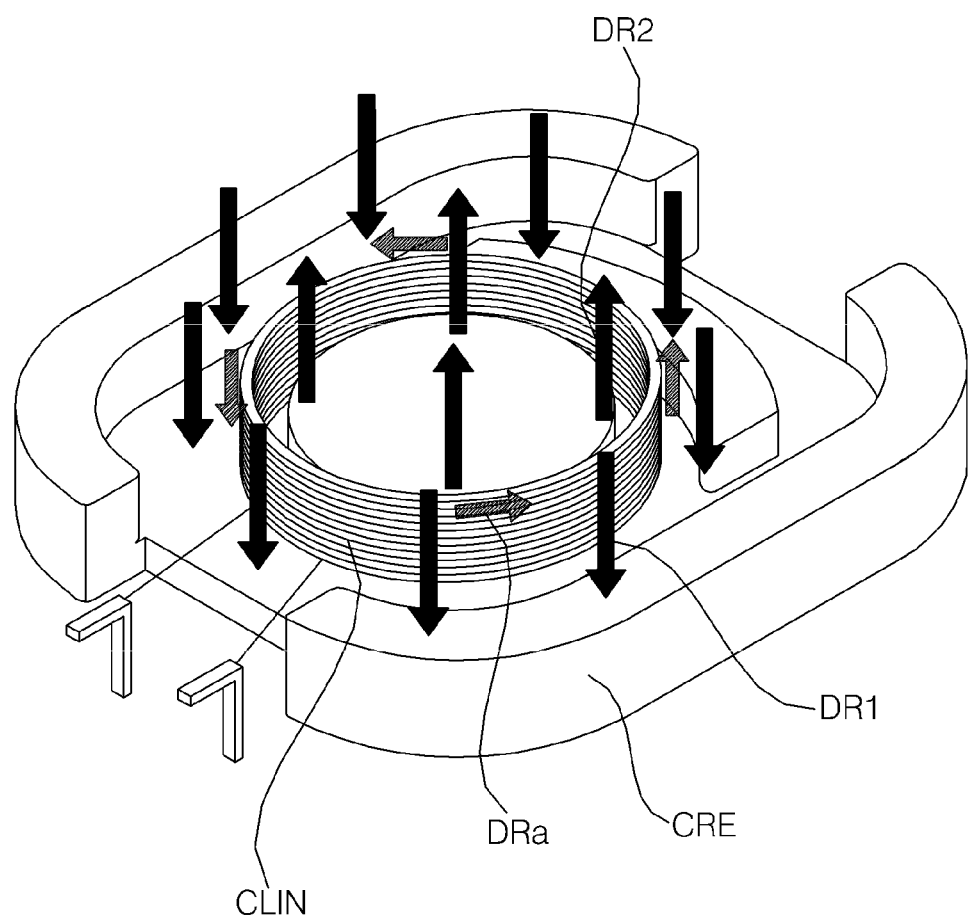

Accordingly, as shown in FIG. 13B, currents in a counter-clockwise direction Dra may flow in the first wire CLIN, a magnetic flux in a downward direction Dr1 may occur in the outside of the first wire CLIN, and a magnetic flux in an upward direction Dr2 may occur in the inside of the first wire CLIN.

Figure 13C:
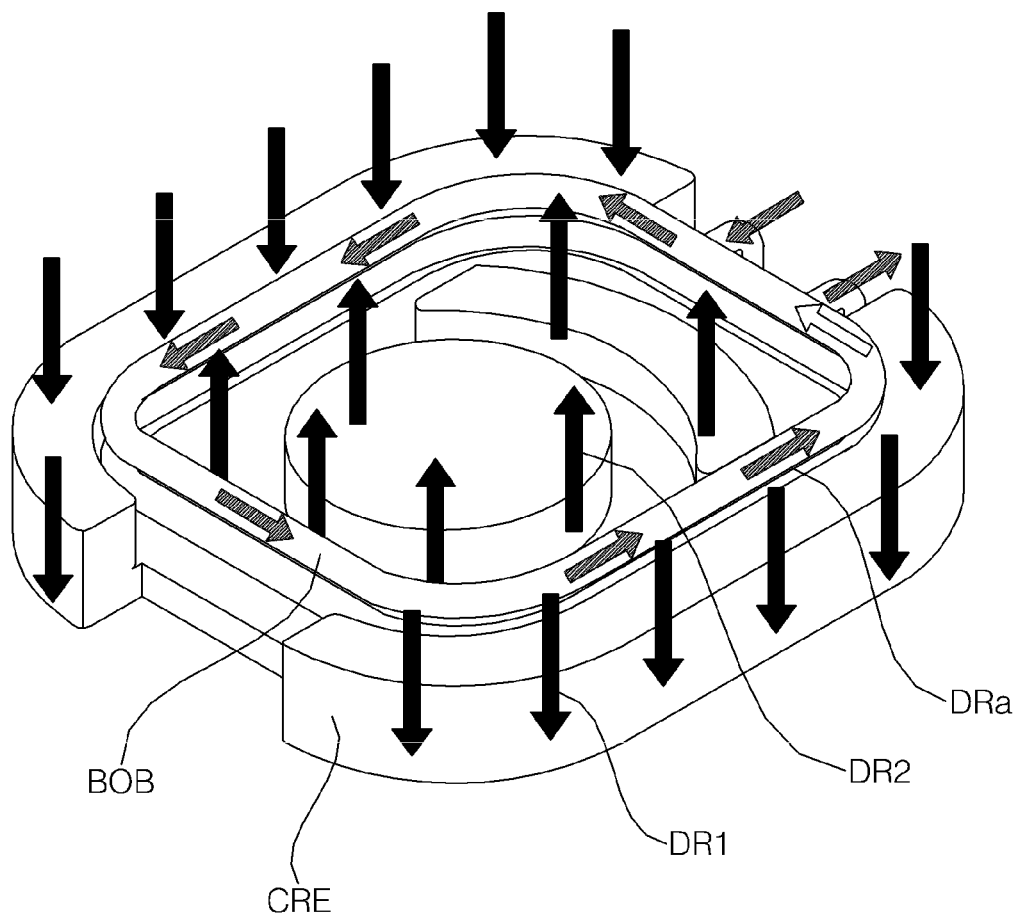

Meanwhile, as shown in FIG. 13C, currents in the counter-clockwise direction Dra may flow in the second wire CLOU, a magnetic flux in the downward direction DR1 may occur in the outside of the second wire CLOU, and a magnetic flux in the upward direction Dr2 may occur in the inside of the second wire CLOU.

Figure 13D:
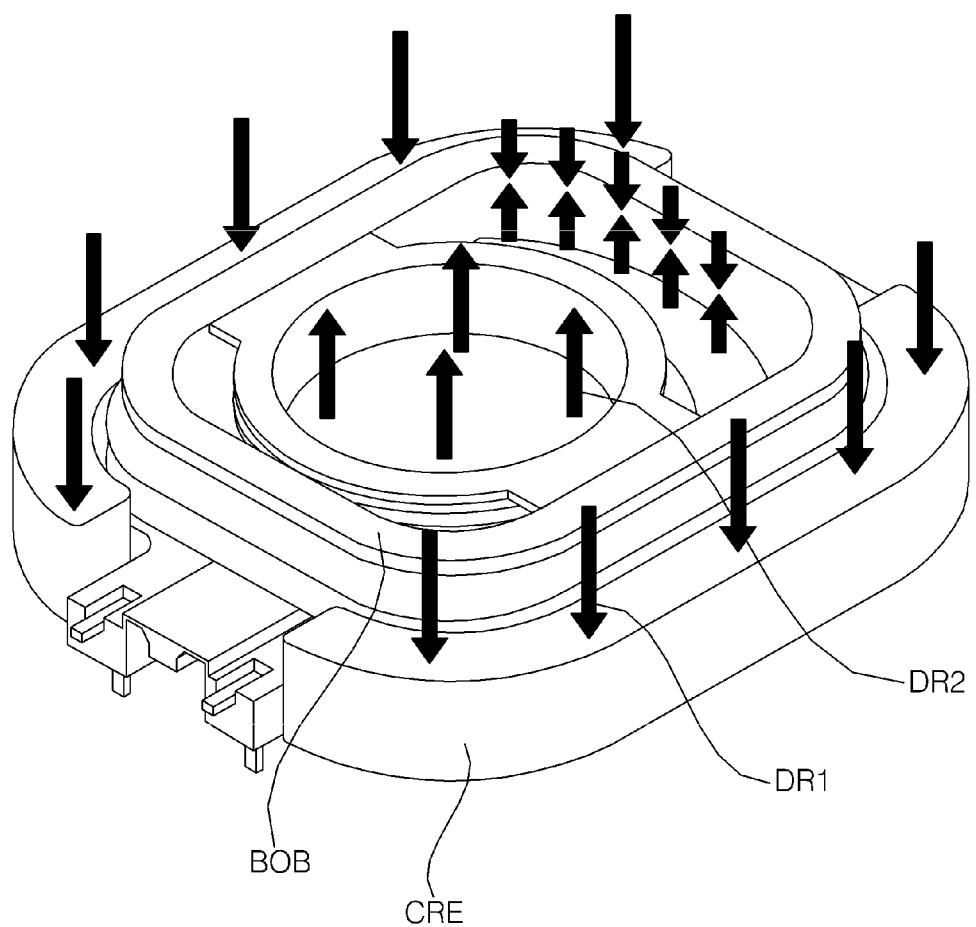

Meanwhile, FIG. 13D shows an example in which directions of the magnetic field flux in FIGS. 13B and 13D are added up.

Referring to the drawing, a magnetic flux in a downward direction Dr1 may occur in the outside of a second wire CLOU by currents flowing in a first wire CLIN and the second wire CLOU, and a magnetic flux in an upward direction Dr2 may occur in the inside of a first protruding member INBa by currents flowing in the first wire CLIN and the second wire CLOU.

However, in the proximity to the second protruding member INBb, the direction of the magnetic flux based on the first wire CLIN is a downward direction and the direction of the magnetic flux based on the second wire CLOU is an upward direction Dr2, and thus the directions alternate each other. Therefore, a leakage inductance occurs.

In the present invention, the leakage inductance is controlled by use of such a difference. In particular, the leakage inductance is controlled with an air gap caused by a difference between a height of the second protruding member INBb and a height ha of the first protruding member INBa. Accordingly, it is possible to manufacture an integrated transformer UTR having a leakage inductor suitable for design specification.

Figure 14A:
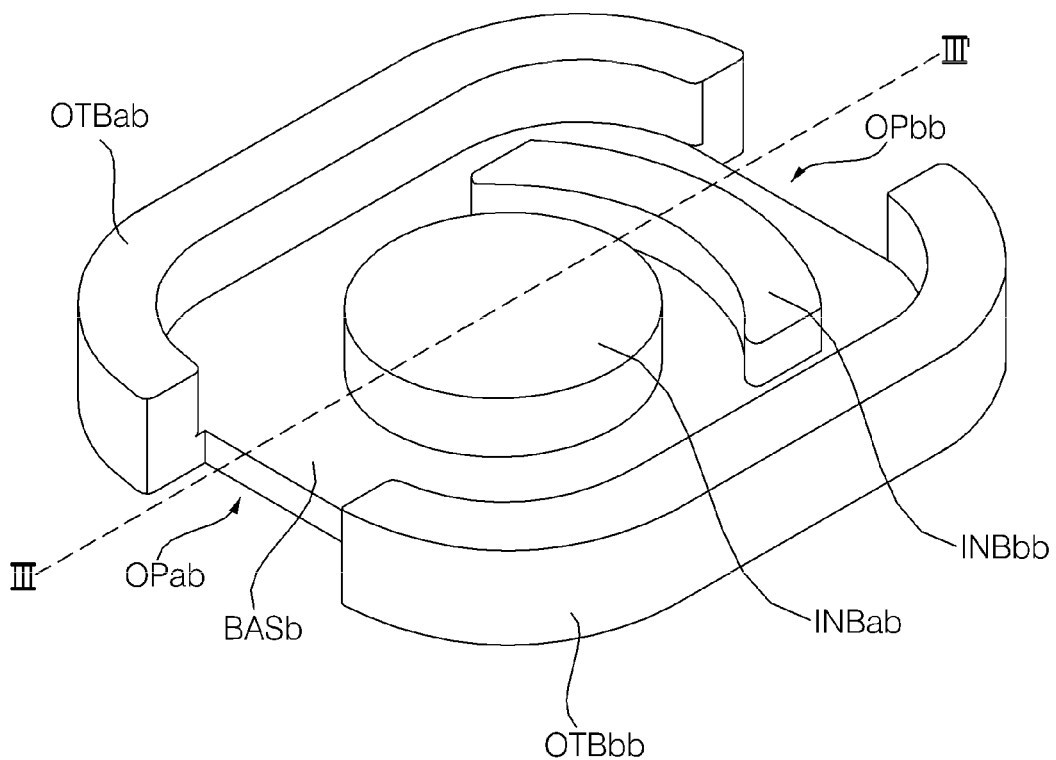
Figure 14B:
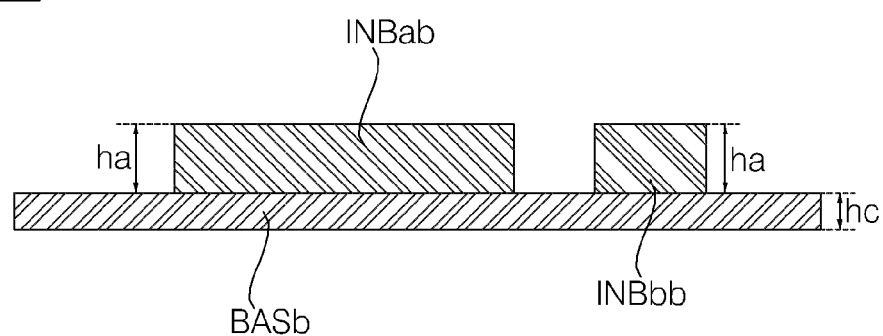

FIG. 14A is a diagram showing a second core in an integrated transformer according to an embodiment of the present invention, and FIG. 14B is a diagram referred to in the description of FIG. 14A.

Referring to the drawing, a second core CREb in an integrated transformer of FIG. 14A may include: a second base BASb; second outer walls OTBab and OTBbb formed on the second base BASb; a third protruding member INBab protruding on the second base BASb and disposed within the second outer walls OTBab and OTBbb; and a fourth protruding member INBbb protruding on the second base BASb and disposed within the second outer walls OTBab and OTBbb and separated from the third protruding member INBab.

FIG. 14A shows an example in which openings OPab and OPbb are formed between the second outer walls OTBab and OTBbb formed on the second base BASb.

In the drawing, the fourth protruding member INBbb is disposed in a direction of a fourth opening OPbb that is one of the plurality of openings OPab and OPbb.

An external conductive line may be received or drawn through the openings OPab and OPbb.

Meanwhile, unlike the example of FIG. 14A, a single opening rather than the plurality of openings OPab and OPbb may be formed.

Meanwhile, although the third protruding member INBab has a circular shape in FIG. 14A, the third protruding member INBab may have an elliptical shape. That is, the shape of the third protruding member INBab may correspond to the shape of the first protruding member INBa and may have any of various shapes.

Meanwhile, the second base BASb, the second outer walls OTBab and OTBbb, the third protruding member INBab, and the fourth protruding member INBbb in the second core CREb may be formed of the same material. For example, the second base BASb, the second outer wall OTBab and OTBbb, the third protruding member INBab, and the fourth protruding member INBbb in the second core CREb may be made of ferrite.

Meanwhile, in the case where the second core CREb is made of a ferrite material, it is preferable to manufacture the second core CREb by a molding technique. Accordingly, it is possible to manufacture the second core CREb easily.

Meanwhile, it is preferable that an edge of the fourth protruding member INBbb opposing the third protruding member INBab is smaller in length than an outer circumference of the third protruding member INBab In particular, it is preferable that the third protruding member INBab has a circular shape and that a length of the edge of the fourth protruding member INBbb opposing the third protruding member INBab is less than a half of the outer circumference of the third protruding member INBab.

Meanwhile, in the case where the first core CRE alone, without the second core CREb, is in charge of micro-machining of a leakage inductance, the third protruding member INBab and the fourth protruding member INBbb may have the same protruding height.

Accordingly, as shown in FIG. 14B, the third protruding member INBab and the fourth protruding member INBbb may have the same protruding height of ha.

Meanwhile, in the case where both the first core CRE and the second core CREb are in charge of micro-machining of a leakage inductance, it is preferable that a protruding height of the fourth protruding member INBbb is less than a protruding height of the third protruding member INBab. That is, a shape similar to the example of FIG. 10B may be achieved.

Figure 15A:
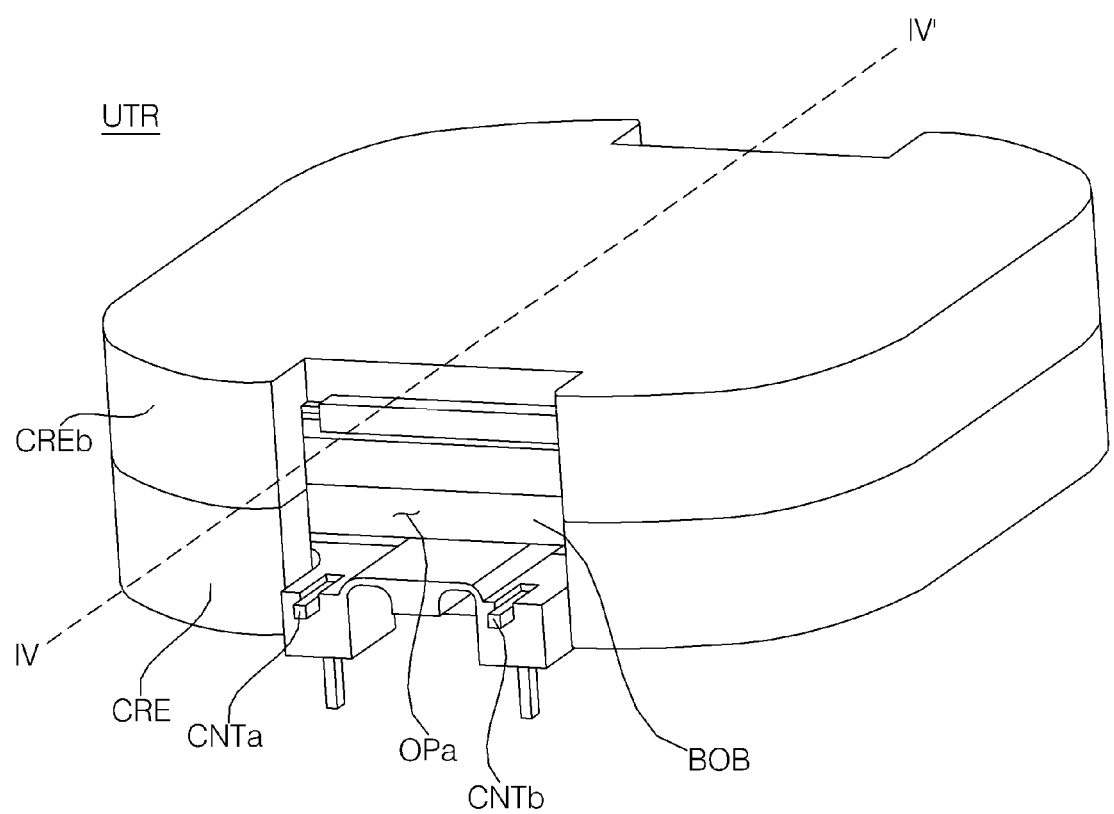
Figure 15B:
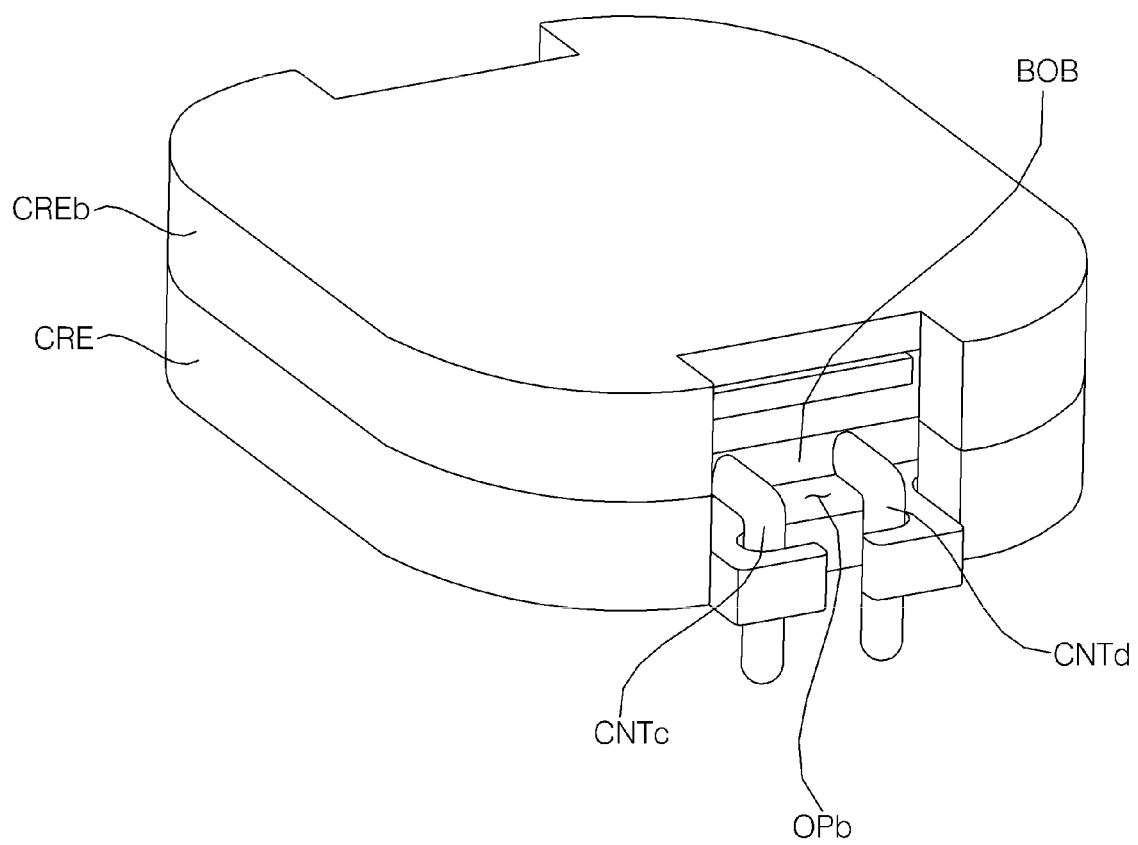

FIGS. 15A and 15B are diagrams showing an external appearance of an integrated transformer UTR in the case where a first core CRE, a bobbin structure BOB, and a second core CREb are coupled.

FIG. 15A is a diagram showing an external appearance of an integrated transformer UTR, as seen from a first opening OPa, and FIG. 15B is a diagram showing an external appearance of the integrated transformer UTR, as seen from a second opening OPb.

A first bobbin BINB or a second bobbin BOTB is covered by the second core CREb, eventually making it possible to manufacture an integrated transformer UTR with a low height.

Figure 15C:
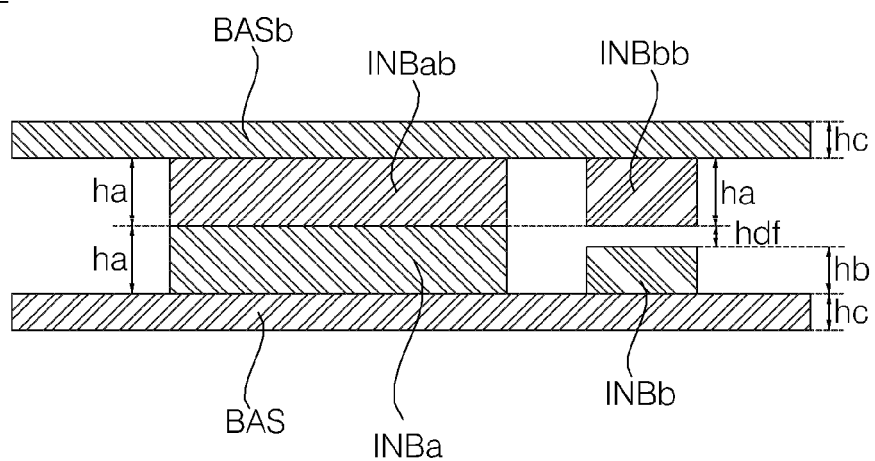

FIG. 15C is a cross-sectional view of FIG. 15A, taken along line IV-IV'

For convenience of explanation, a first bobbin, a second bobbin, a first wire, and a second wire in the bobbin structure BOB are omitted in FIG. 15C.

Referring to the drawing, a protruding height ha of a first protruding member INBa in the core CRE in the integrated transformer UTR is less than a protruding height hb of a second protruding member INBb, and a protruding height ha of the third protruding member INBab in the second core CREb and a protruding height ha of the fourth protruding member INBbb are identical.

In addition, the first protruding member INBa in the core CRE comes into contact with the third protruding member INBab in the second core CREb.

Figure 16A:
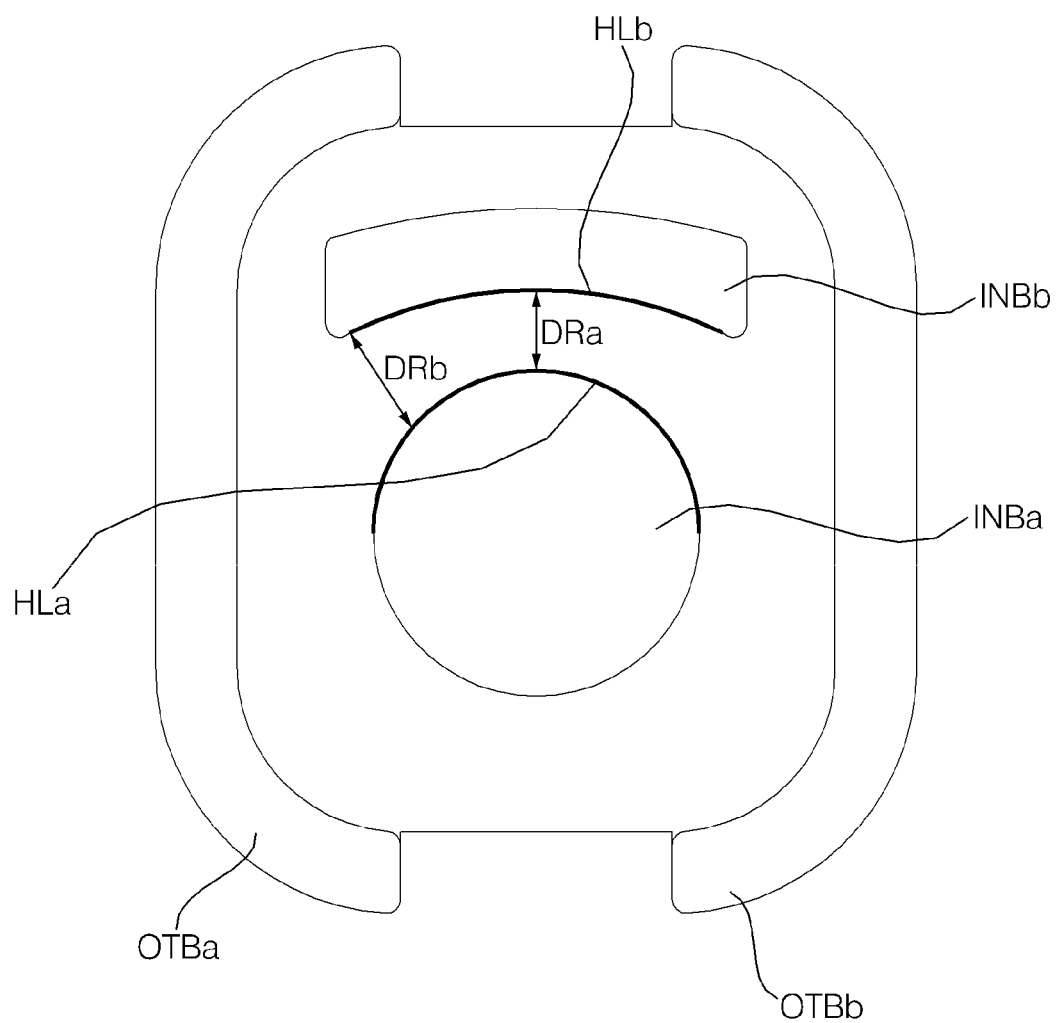
FIG. 16A to 16C are diagrams showing various examples of a core according to an embodiment of the present invention.
Figure 16B:
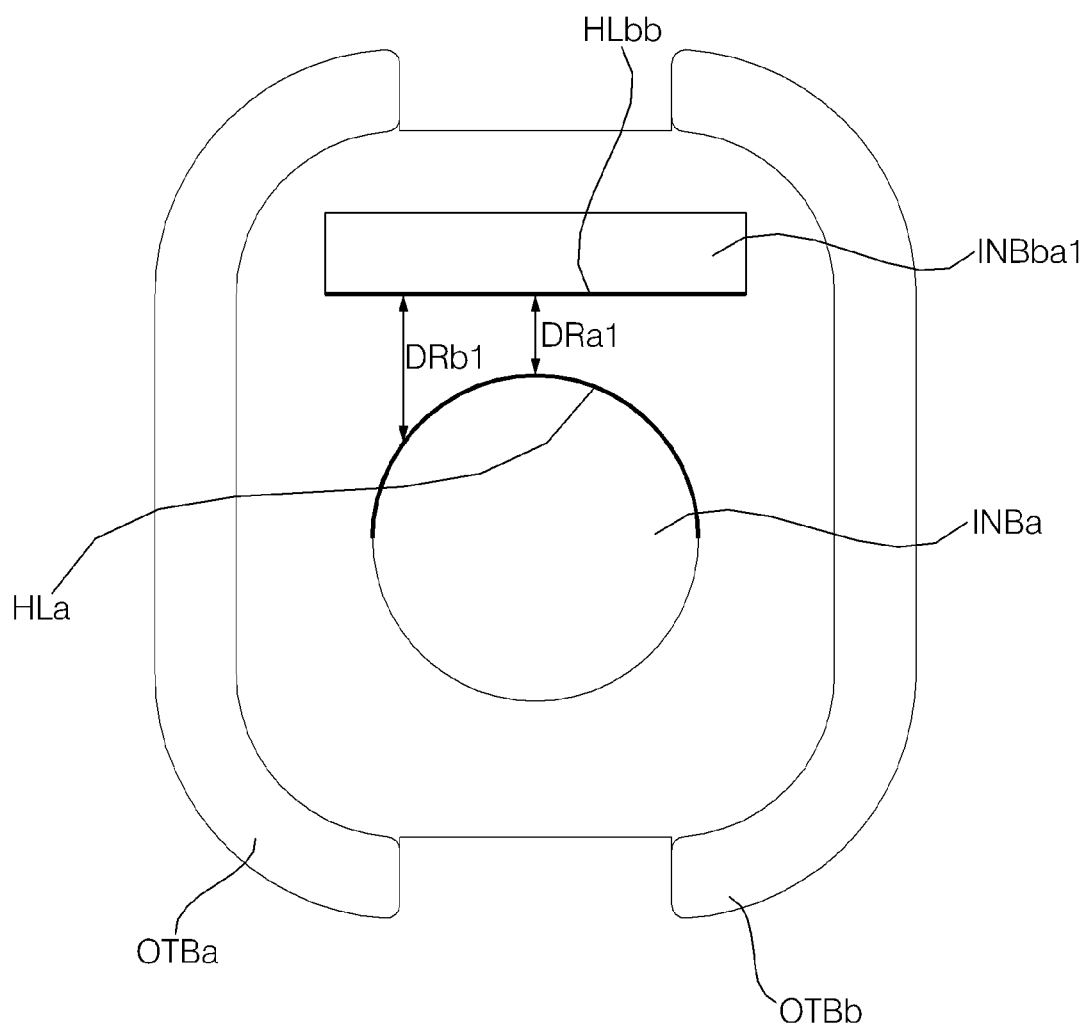
Figure 16C:
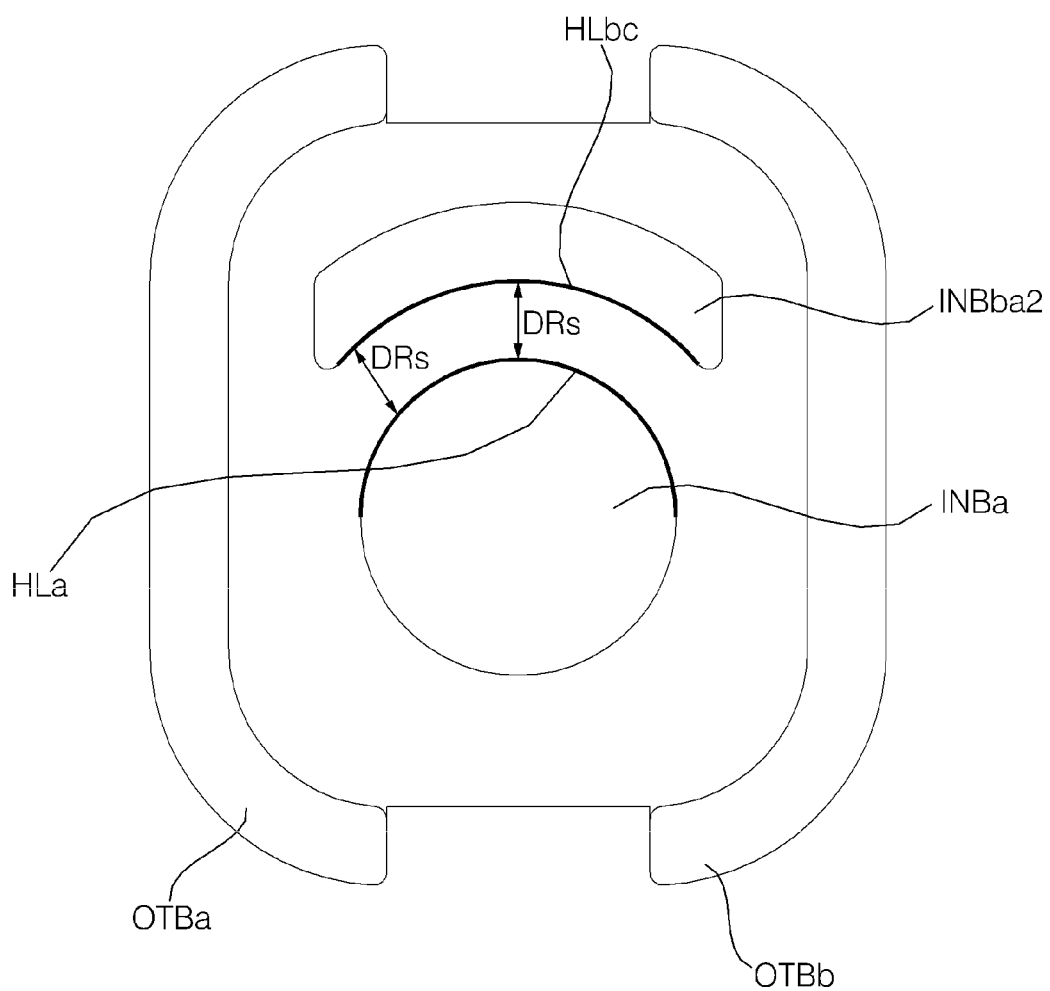

FIG. 16A to 16C are diagrams showing various examples of a core according to an embodiment of the present invention.

First, FIG. 16A shows an example of a core CRE according to an embodiment of the present invention.

A first protruding member INBa in the core CRE according to an embodiment of the present invention may have a circular shape, as shown in FIG. 16A, and a second protruding member INBb may have a curved shape. Accordingly, a wire may be wound easily.

Meanwhile, it is preferable that a length HLb of an edge of the second protruding member INBb opposing the first protruding member INBa is less than a half HLa of an outer circumference of the first protruding member INBa. Accordingly, it is easy to machine the second protruding member INBb, thereby making it easy to control a leakage inductance according to design specification.

Meanwhile, it is preferable that the core CRE according to an embodiment of the present invention is configured to have a gap between the first protruding member INBa and the second protruding member INBb that increases from the central area to the side area of the second protruding member INBb.

FIG. 16A shows an example in which a gap between the first protruding member INBa and the second protruding member INBb in the central area is Dra, while a gap between the first protruding member INBa and the second protruding member INBb in the side area is DRb greater than Dra. Accordingly, a wire may be wound easily.

Next, FIG. 16B shows an example of a core CREa1 according to another embodiment of the present invention.

A second protruding member INBba1 in the core CREa1 according to another embodiment of the present invention may have a straight shape, unlike the example shown in FIG. 16A.

Meanwhile, it is preferable that a length HLbb of an edge of the second protruding member INBba1 opposing a first protruding member INBa is less than a half LHa of an outer circumference of the first protruding member INBa. Accordingly, it is easy to machine the second protruding member INBba1, thereby making it easy to control a leakage inductance according to design specification.

Meanwhile, it is preferable that the core CREa1 according to an embodiment of the present invention is configured to have a gap between the first protruding member INBa and the second protruding member INBba1 that increases from the central area to the side area of the second protruding member INBba1.

FIG. 16B shows an example in which a gap between the first protruding member INBa and the second protruding member INBba1 in the central area is Dra1 and a gap between the first protruding member INBa and the second protruding member INBba1 in the side area is DRB1 greater than Dra1. Accordingly, a wire may be wound easily.

Next, FIG. 16C shows an example of a core CREa2 according to yet another embodiment of the present invention.

A second protruding member INBba2 in the core CREa2 according to yet another embodiment of the present invention may have a curved shape, unlike the example shown in FIG. 16B.

In particular, a gap between a first protruding member INBa and the second protruding member INBba2 may be maintained constant at DRs.

Meanwhile, it is preferable that a length HLbc of an edge of the second protruding member INBba2 opposing the first protruding member INBa is less than a half HLa of an outer circumference of the first protruding member INBa. Accordingly, it is easy to machine the second protruding member INbb, thereby making it easy to control a leakage inductance according to design specification.

Figure 17:
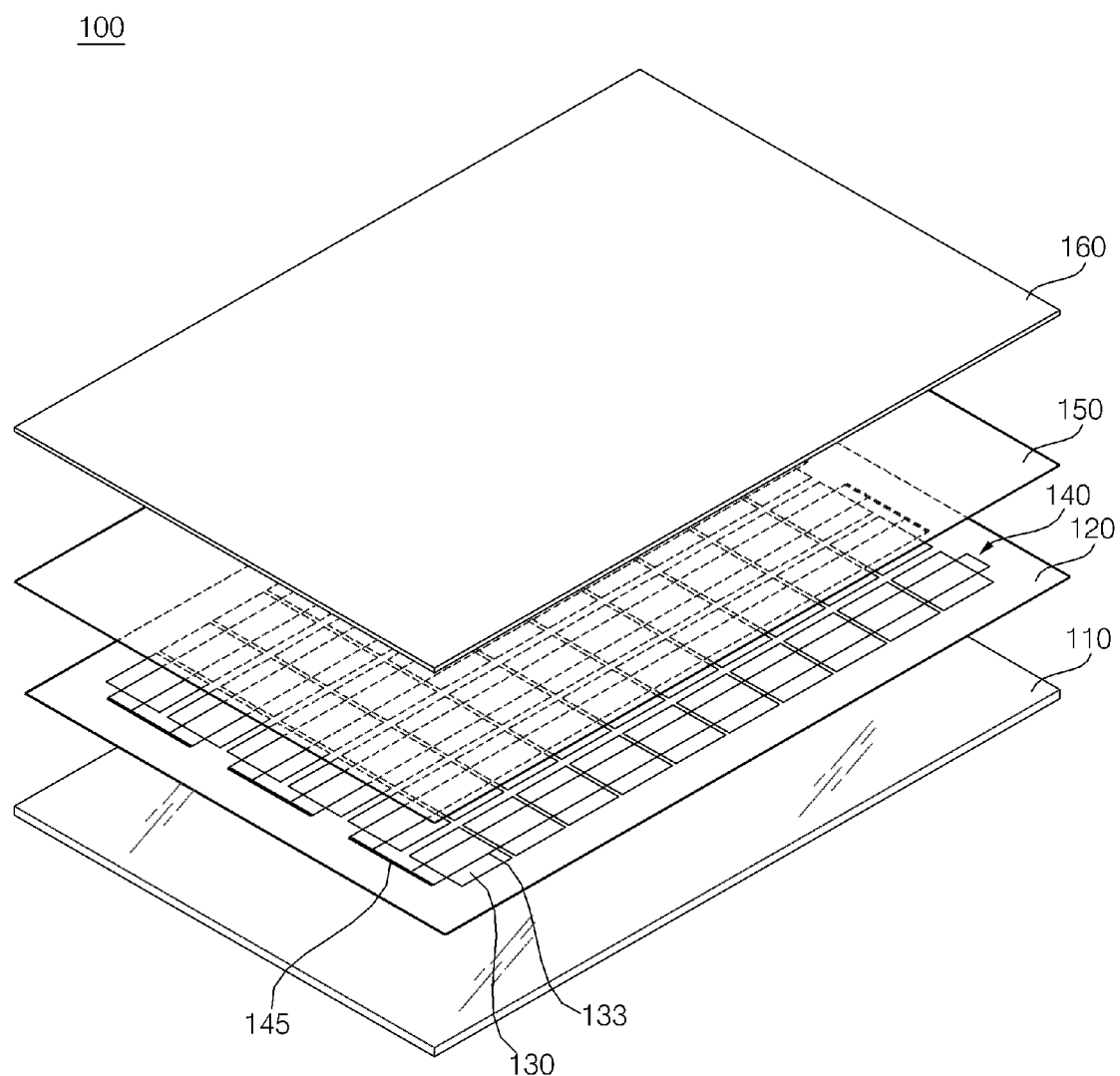
FIG. 17 is an exploded perspective view of a solar cell module of FIG. 2.

FIG. 17 is an exploded perspective view of the solar cell module of FIG. 2.

Referring to FIG. 17, the solar cell module 100 of FIG. 2 can include a plurality of solar cells 130. In addition, the solar cell module 100 can further include a first sealant 120 and a second sealant 150 provided on the upper surface and the lower surface of the solar cells 130, a rear substrate 110 provided under the first sealant 120, and a front substrate 160 provided on the second sealant 150.

The solar cell 130 is a semiconductor device which converts solar energy into electric energy and can be a silicon solar cell, a compound semiconductor solar cell, a tandem solar cell, a dye-sensitized solar cell, a CdTe solar cell, a CIGS solar cell or a thin film solar cell.

The solar cell 130 is formed on a light-receiving surface to which sunlight is input and a rear surface opposite the light-receiving surface. For example, the solar cell 130 can include a first conductivity type silicon substrate, a second conductivity type semiconductor layer which is formed on the silicon substrate and has a conductivity type opposite the first conductivity type, an antireflection film which includes at least one opening for partially exposing the second conductivity type semiconductor layer and is formed on the second conductivity type semiconductor layer, a front electrode contacting a portion of the second conductivity type semiconductor layer exposed through the at least one opening, and a rear electrode formed on the rear side of the silicon substrate.

The solar cells 130 can be electrically connected in series or parallel, or in serial-parallel. Specifically, the plurality of solar cells 130 can be electrically connected through the ribbon 133. The ribbon 133 can be attached to the front electrode formed on the light-receiving surface of a solar cell 130 and a rear electrode formed on the rear side of a neighboring solar cell 130.

The figure shows that the ribbon 133 is formed in two lines and the solar cells 130 are connected in a row through the ribbon 133 to form a solar cell string 140.

In this manner, six strings 140a, 140b, 140c, 140d, 140e and 140f are formed and each string can include ten solar cells, as described above with reference to FIG. 2.

The rear substrate 110 is a back sheet and serves to execute waterproofing, insulation and sunblocking functions. The rear substrate 110 can be a Tedlar/PET/Tedlar (TPT) type but the present invention is not limited thereto. In addition, although the rear substrate 110 is rectangular in FIG. 4, the rear substrate 110 can be manufactured in various forms such as a circle and a semicircle according to environment in which the solar cell module 100 is installed.

The first sealant 120 can be attached to the rear substrate 110 having the same size as the rear substrate 110, and a plurality of solar cells 130 can be arranged in several rows on the first sealant 120.

The second sealant 150 is positioned on the solar cells 130 and is attached to the first sealant 120 through lamination.

Here, the first sealant 120 and the second sealant 150 are used to chemically connect elements of the solar cells. Various materials such as ethylene vinyl acetate (EVA) film can be used as the first sealant 120 and the second sealant 150.

The front substrate 160 is positioned on the second sealant 150 such that sunlight is transmitted through the front substrate 160. It is desirable that the front substrate 160 be tempered glass in order to protect the solar cells 130 from external impact, but other materials can be used. It is more desirable that the front substrate 160 be low-iron tempered glass in order to prevent reflection of sunlight and to improve transmissivity of sunlight.

The photovoltaic module according to the present invention is not limited to the above-described embodiments and all or some of the embodiments can be selectively combined such that the embodiments can be modified in various manners.

Although the example embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A core comprising:
   a base;
   a first outer wall and a second outer wall formed on the base;
   a first protruding member protruding on the base and disposed within the first outer wall and the second outer wall; and
   a second protruding member protruding on the base, disposed within the first outer wall and the second outer wall, and separated from the first protruding member,
   wherein a length of an edge of the second protruding member opposing the first protruding member is less than an outer circumference of the first protruding member,
   wherein a first opening and a second opening opposite to each other are formed in a first axial direction between the first outer wall and the second outer wall for input or output of an external conductive line,
   wherein the first opening, the first protruding member, the second protruding member, and the second opening are sequentially formed based on the first axial direction,
   wherein the first protruding member has a circular shape,
   wherein the second protruding member has a curved shape, and
   wherein a gap between the first protruding member and the second protruding member is substantially constant.

2. The core of claim 1,
   wherein the first protruding member has a circular shape, and
   wherein the length of the edge of the second protruding member opposing the first protruding member is less than a half of the outer circumference of the first protruding member.

3. The core of claim 1, wherein a protruding height of the second protruding member is less than a protruding height of the first protruding member.

4. The core of claim 1, wherein a gap between the first protruding member and the second protruding member increases from a central area toward a side area of the second protruding member.

5. The core of claim 1, wherein the base, the first outer wall and the second outer wall, the first protruding member, and the second protruding member are formed of a same material.

6. A transformer comprising:
   a core, wherein the core comprises a base, a first outer wall and a second outer wall formed on the base, a first protruding member protruding on the base and disposed within the first outer wall and the second outer wall, and a second protruding member protruding on the base, disposed within the first outer wall and the second outer wall, and separated from the first protruding member;
   a first bobbin surrounding the first protruding member in the core; and
   a second bobbin surrounding the first protruding member and the second protruding member in the core,
   wherein a length of an edge of the second protruding member opposing the first protruding member is less than an outer circumference of the first protruding member,
   wherein a first opening and a second opening opposite to each other are formed in a first axial direction between the first outer wall and the second outer wall for input or output of an external conductive line,
   wherein the first opening, the first protruding member, the second protruding member, and the second opening are sequentially formed based on the first axial direction,
   wherein the first protruding member has a circular shape,
   wherein the second protruding member has a curved shape, and
   wherein a gap between the first protruding member and the second protruding member is substantially constant.

7. The transformer of claim 6, further comprising:
   a first wire wound around the first bobbin; and
   a second wire wound around the second bobbin.

8. The transformer of claim 7,
   wherein the first opening and the second opening opposing each other are formed in the first outer wall and the second outer wall of the core, and
   wherein the transformer further comprises:
   a first connection part and a second connection part disposed in a direction of the first opening and electrically connected to the first wire; and
   a third connection part and a fourth connection part disposed in a direction of the second opening and electrically connected to the second wire.

9. The transformer of claim 7, wherein the first wire and the second wire have an identical winding direction.

10. The transformer of claim 7,
    wherein the first opening and the second opening opposing each other are formed in the first outer wall and the second outer wall of the core,
    wherein the first wire extends in a direction of the first opening, and
    wherein the second wire extends in a direction of the second opening.

11. The transformer of claim 6, further comprising a connection member connecting the first bobbin and the second bobbin.

12. The transformer of claim 6, wherein a height of the first bobbin or the second bobbin is greater than a height of the first protruding member.

13. The transformer of claim 6, wherein a height of the first bobbin and a height of the second bobbin are equal.

14. The transformer of claim 6, wherein the first bobbin and the second bobbin are attachable to and detachable from the core.

15. The transformer of claim 6, further comprising a second core disposed on the first bobbin, the second bobbin and the core, wherein the first bobbin and the second bobbin are disposed between the core and the second core,
    wherein the second core comprises:
    a second base;
    a third outer wall and a fourth outer wall formed on the second base;
    a third protruding member protruding on the second base and disposed within the third outer wall and the fourth outer wall; and a fourth protruding member protruding on the second base, disposed within the third outer wall and the fourth outer wall, and separated from the third protruding member, and wherein a length of an edge of the fourth protruding member opposing the third protruding member is less than an outer circumference of the third protruding member.

16. The transformer of claim 15, wherein a protruding height of the third protruding member and a protruding height of the fourth protruding member are equal.

17. A power converting apparatus comprising the transformer of claim 6.

18. A photovoltaic module comprising the power converting apparatus of claim 17.

* * * * *